US006697070B1

(12) United States Patent
Katsura et al.

(10) Patent No.: US 6,697,070 B1
(45) **Date of Patent: *Feb. 24, 2004**

(54) GRAPHIC PROCESSING SYSTEM

(75) Inventors: Koyo Katsura, Hitachiota (JP); Shigeru Matsuo, Hitachi (JP); Shigeaki Yoshida, Sayama (JP); Hiroshi Takeda, Kodaira (JP); Hisashi Kaziwara, Hitachi (JP)

(73) Assignees: Renesas Technology Corporation, Tokyo (JP); Hitachi Engineering Co., Ltd., Hitachi (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/454,590

(22) Filed: Dec. 7, 1999

Related U.S. Application Data

(60) Continuation of application No. 08/625,241, filed on Apr. 1, 1996, now Pat. No. 6,538,653, which is a continuation of application No. 07/542,825, filed on Jun. 25, 1990, now abandoned, which is a division of application No. 06/905,173, filed on Sep. 9, 1986, now Pat. No. 4,947,342.

(30) Foreign Application Priority Data

Sep. 13, 1985 (JP) .......................................... 85-201549

(51) Int. Cl.$^7$ ............................................... G06T 11/00
(52) U.S. Cl. ....................................................... 345/469
(58) Field of Search ................................. 345/469, 551

(56) References Cited

U.S. PATENT DOCUMENTS

| | | | | |
|---|---|---|---|---|
| 3,396,377 | A | 8/1968 | Strout | 340/790 |
| 3,422,419 | A | 1/1969 | Mathews et al. | 340/790 X |
| 4,122,438 | A | 10/1978 | Bird | 340/731 X |
| 4,241,340 | A | 12/1980 | Raney, Jr. | 340/731 |
| 4,283,724 | A | 8/1981 | Edwards | 340/790 X |

(List continued on next page.)

FOREIGN PATENT DOCUMENTS

| | | |
|---|---|---|
| EP | 0071744 | 2/1983 |
| EP | 0105491 | 4/1984 |
| WO | 8204153 | 11/1982 |

OTHER PUBLICATIONS

Katsura, et al, "Graphic Display Processor to Integrate Drawing Algorithms and Display Controls", Proceeding of Wescon '84, No. 2313, Nov. 1984.

Katsura, et al "Advanced CRT Controller for Graphic Display", Hitachi Review, vol. 33, No. 5, pp. 247–255, Oct., 1984.

Stone, Microcomputer Interfacing, 1982, Addison Wesley Publishing, pp. 1–2.

*Primary Examiner*—Almis R. Jankus
(74) *Attorney, Agent, or Firm*—Antonelli, Terry, Stout & Kraus

(57) ABSTRACT

A graphic processing system has a processor for managing a display area and a character font area both include within an are disposed in the address space. From coded information indicative of a character transferred through a data bus of the system, the processor generates an address at which a character font pattern of the corresponding character has been stored and transfers that character font pattern to a predetermined position on the display area. The graphic processing system realizes high speed development of fonts.

4 Claims, 26 Drawing Sheets

U.S. PATENT DOCUMENTS

| | | | | | |
|---|---|---|---|---|---|
| 4,298,957 | A | | 11/1981 | Duvall | 364/900 |
| 4,366,475 | A | | 12/1982 | Kishi et al. | 395/139 X |
| 4,388,620 | A | | 6/1983 | Sherman | 340/731 X |
| 4,408,200 | A | | 10/1983 | Bradley | 340/731 X |
| 4,477,802 | A | | 10/1984 | Walter et al. | 340/731 X |
| 4,510,568 | A | | 4/1985 | Kishi et al. | 364/521 X |
| 4,532,605 | A | | 7/1985 | Waller | 395/139 |
| 4,622,546 | A | * | 11/1986 | Sfarti et al. | 345/471 |
| 4,622,641 | A | | 11/1986 | Stephens | 340/731 X |
| 4,630,039 | A | | 12/1986 | Shimada | 340/731 |
| 4,646,077 | A | | 2/1987 | Culley | 340/735 X |
| 4,654,804 | A | | 3/1987 | Thaden et al. | 364/521 X |
| 4,661,808 | A | | 4/1987 | Rector et al. | 340/790 X |
| 4,703,320 | A | | 10/1987 | Okano | 340/731 |
| 4,706,213 | A | | 11/1987 | Bandai | 340/724 X |
| 4,712,102 | A | | 12/1987 | Troupes et al. | 340/790 |
| 4,716,533 | A | | 12/1987 | Ohmori | 340/724 X |
| 4,751,507 | A | | 6/1988 | Hama et al. | 340/731 X |
| 4,829,452 | A | | 5/1989 | Kang et al. | 395/137 |
| 4,947,342 | A | * | 8/1990 | Katsura et al. | 345/467 |

* cited by examiner note) (O.D): Open Drain Output, (T): Trℓ-State Output

F I G. 5

| CS | RS | R/W | | Register Name | Abbr | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|
| | | | | | | DATA(U) | | | | | | | | DATA(L) | | | | | | | |
| 1 | – | – | | – | | – | | | | | | | | – | | | | | | | |
| 0 | 0 | 0 | | Address Register | AR | – | | | | | | | | Address | | | | | | | |
| 0 | 0 | 1 | | Statug Register | SR | FIFO Slatds X | | | | | | | | CER | ARD | CED | EGD | RFF | RFR | QFR | WFE |
| 0 | 1 | 1 0 | | FIFO Rntry | FE | FIFO Entry | | | | | | | | | | | | | | | |
| | | 1 0 | | Command Control | CCR | ABT | PSE | DDM | CDM | DRC | GBM | | | CRE | ARE | CEE | – | RFE | RRE | WRE | WEE |
| | | 1 0 | | OPeration Mode | OMR | MIS | STR | ACP | – | CSK | | DSK | | ACM | GAI | | | RAM | | RSM | |
| | | 1 0 | | DisPlay Control | DCR | | BE | – | | | | | | ATR | | | | | | | |
| | | 0 | | Memory Access Control X | MAC | – | | | | | | | | MAC | | | | | | | |
| | | | | | | | | | | | | | | | | | | | | | |
| | | 1 | | Raster Count | RCR | – | | RC | | | | | | | | | | | | | |
| | | 1 0 | | Horizontal Sync | HSR | HC | | | | | | | | | | – | HSW | | | | |
| | | 1 0 | | Horizontal Display Start | HDS | – | | | | | | | | HDS | | | | | | | |
| | | 1 0 | | Horizontal Display Width | HDW | – | | | | | | HDW | | | | | | | | | |
| | | 1 0 | | Vertical Sync | VSR | – | | VC | | | | | | | | | | | | | |
| | | 1 0 | | Vertical Display Control | VDC | VDS | | | | | | | | – | | | VSW | | | | |
| | | 1 0 | | Vertical Display Width | VDW | – | | VDW | | | | | | | | | | | | | |
| | | 1 0 | | Blink Control | BCR | BONI | | | | BOFFI | | | | | | | | | | | |
| | | 1 0 | | Graphle Cursor | GCR | – | | | | | | CXS | | | | | | | | | |
| | | 1 0 | | | | – | | | | | | CXE | | | | | | | | | |
| | | 1 0 | | | | – | | CYS | | | | | | | | | | | | | |
| | | 1 0 | | | | – | | CYS | | | | | | | | | | | | | |
| | | | | | | | | | | | | | | | | | | | | | |
| | | 1 0 | | Memory Width | MWR | – | | | | MW | | | | | | | | | | | |
| | | 1 0 | | Start Address | SAR | – | | | | SDA | | | | – | | SAH | | | | | |
| | | 1 0 | | | | SAL | | | | | | | | | | | | | | | |
| | | 1 0 | | Cursor Definition | CDR | | | CONI | | | COFFI | | | – | | | | | | | |

F I G. 6

| Read/Write | Name of Register | Abbr | Data(H) | | | | | | | | Data(L) | | | | | | | |
|---|---|---|---|---|---|---|---|---|---|---|---|---|---|---|---|---|---|---|
| | | | 15 | 14 | 13 | 12 | 11 | 10 | 9 | 8 | 7 | 6 | 5 | 4 | 3 | 2 | 1 | 0 |
| R/W | Coloro | CLO | CLO | | | | | | | | | | | | | | | |
| R/W | Colorl | CLI | CLI | | | | | | | | | | | | | | | |
| R/W | Color Comparison | CCMP | CCMP | | | | | | | | | | | | | | | |
| R/W | Edge Color | EDG | EDG | | | | | | | | | | | | | | | |
| R/W | Pattern RAM Control | PRC | | PPY | | | | PZCV | | | | PPX | | | | PZCX" | | |
| | | | | PSY | | | | | | | | PSX | | | | | | |
| | | | | PSE | | | | PZY | | | | PEX | | | | PZX | | |
| R/W | Area Definition" | ADR | XMIN | | | | | | | | | | | | | | | |
| | | | YMIN | | | | | | | | | | | | | | | |
| | | | XMAX | | | | | | | | | | | | | | | |
| | | | YMAX | | | | | | | | | | | | | | | |
| R/W | Font Area Start Address ⁎ | FSA | FSAH | | | | | | | | | | | | | | | |
| | | | FSAL | | | | | | | | | | | | | | | |
| R/W | Font Area Memory Width ⁎ | FAMW | FAMW | | | | | | | | | | | | | | | |
| R/W | Font Bit Number ⁎ | FBN | FRW | | | | | | | | | | | | | | | |
| R/W | Character Spacing ⁎ | CHS | CHS | | | | | | | | | | | | | | | |
| R/W | Font Size ⁎ | FS | FSV | | | | | | | | FSX | | | | | | | |
| R | Drawing Pointer | DP | | | | | | | DPAH | | | | | | | | | |
| | | | DPM | | | | | | | | | | | | DPD | | | |
| R | Carrent Pointer" | CP | X | | | | | | | | | | | | | | | |
| | | | Y | | | | | | | | | | | | | | | |
| R/W | Drawing Mode ⁎ | DM | DM | | | | | | | | | | | | | | | |

R ----- Register read by a Read Parameter Register (RPR) command
W ----- Register Written by a Write Parameter Register (WPR) command
▨ ---- Always set to 0
" ---- Set binary complemets for negative Values of X and Y axis
⁎ ---- Additional register

FRAME BUFFER

PATTERN RAM

FRAME BUFFER

PATTERN RAM

F I G. 24
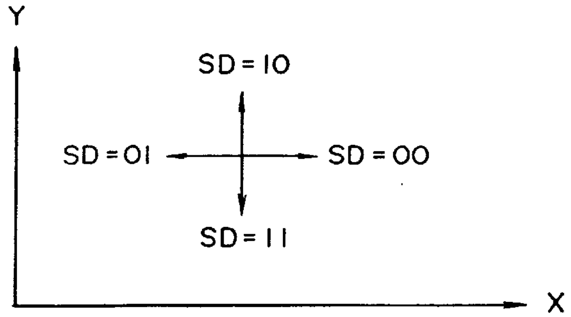
F I G. 25
| SD | SCANNING DIRECTION | E P |
|---|---|---|
| 00 | +X | LIMIT ON X DIRECTION |
| 01 | −X | |
| 10 | +Y | LIMIT ON Y DIRECTION |
| 11 | −Y | |
F I G. 26
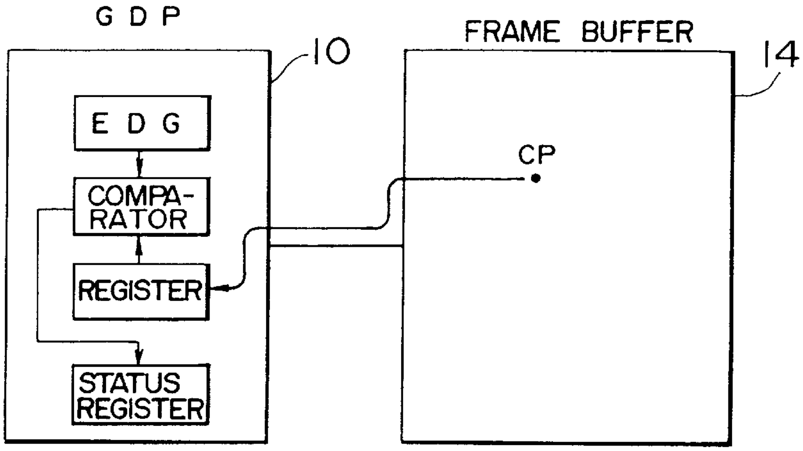

GRAPHIC PROCESSING SYSTEM

This is a continuation of application Ser. No. 08/625,241, filed Apr. 1, 1996; now U.S. Pat. No. 6,538,653, which is a continuation of Ser. No. 07/542,825, filed Jun. 25, 1990 now abandoned; which is a divisional of Ser. No. 06/905,173, filed Sep. 9, 1986, now U.S. Pat. No. 4,947,342.

BACKGROUND OF THE INVENTION

This invention relates to graphic processing systems for delivery of character outputs to be displayed or printed and more particularly to a graphic processing system for to storage and delivery of characters in the form of pixel unit information and is suitable for high speed processing when developing characters at given positions.

When displaying characters and graphics or figures on a cathode-ray tube (CRT) in the raster scanning manner, a bit map system has been available which employs a memory (bit map memory) adapted to store information corresponding to each pixel of a display unit. This system adopting the bit map memory has also been used to control output signals to a printer. Conventionally, a procedure to issue character and graphic data to the bit map memory has mainly relied upon software which handles a great amount of data, raising a problem of low processing speed. Especially, in a field of high speed generation of graphic figures, hardware is dedicated thereto in some applications but is problematically expensive.

On the other hand, a trend of incorporating the function of generating character and graphic data into an LSI has been proposed as reported in publications such as, (1) "Graphic Display Processor to Integrate Drawing Algorithms and Display Controls" by K. Katsura, H. Maejima et al, Proceeding of Wescon '84, No. 2313, November, 1984, and (2) "Advanced CRT Controller for Graphic Display" by K. Katsura, H. Maejima et al, Hitachi Review, Vol. 33, No. 5, pp 247–255, October, 1984.

This LSI implementation permits a remarkable increase in speed of graphic processing at relatively low costs. In addition, the LSI implementation also has a function of copying and transferring information in a rectangular region at high speeds, which function may be applied to a character display. Details of the copying function are proposed by the present inventors in U.S. patent application Ser. Nos. 686,039 filed Dec. 24, 1984 and Ser. No. 727,850 filed Apr. 26, 1985, which issued as U.S. Pat. Nos. 4,862,150 and 4,779,210, respectively. The system applying the copying function to the bit map character display can afford to greatly promote the processing speed as compared to the prior art system based on software. For example, where 1000 Chinese characters each composed of 24 dots×24 dots are displayed in the monochromatic mode, the entire screen can be renewed within about 0.5 to 1 second. In color processing, however, this system faces a problem of degraded performance. Further, the performance of this prior art system is not enough to comply with a needed performance for renewal of the entire screen within about 0.1 second as requested by a field which takes significant account of the man-machine interface.

SUMMARY OF THE INVENTION

An object of this invention is to provide a graphic processing system capable of realizing high speed development of fonts in order to speed up bit map character display.

To accomplish the above object, the present invention provides a processor for managing a display area and a character font area which are included within an address space, and the processor calculates, from coded information indicative of a character transferred through a data bus of a system, an address at which a character font pattern of the corresponding character has been stored and transfers that character font pattern to a predetermined position on the display area.

In the present invention, "character" is the concept representative of the fundamental unit of graphic information such as "English letters", "numerals", "Chinese letters", "kana letters", "symbols" and "fundamental graphics".

Other objects and features of the present invention will become apparent from the following description taken in conjunction with the accompanying drawings.

BRIEF DESCRIPTION OF THE DRAWINGS

FIGS. 4 to 6 explain internal registers of the graphic drawing processor;

FIGS. 24 and 25 explain a search (SRCH) command;

FIG. 26 is a diagram for explaining a test dot (TDOT) command;

FIGS. 34, ad 34(A)–34(*c*) are views showing a layout in which

DESCRIPTION OF THE PREFERRED EMBODIMENTS

Preferred embodiments of the invention will now be described with reference to the accompanying drawings.

Figure 1:
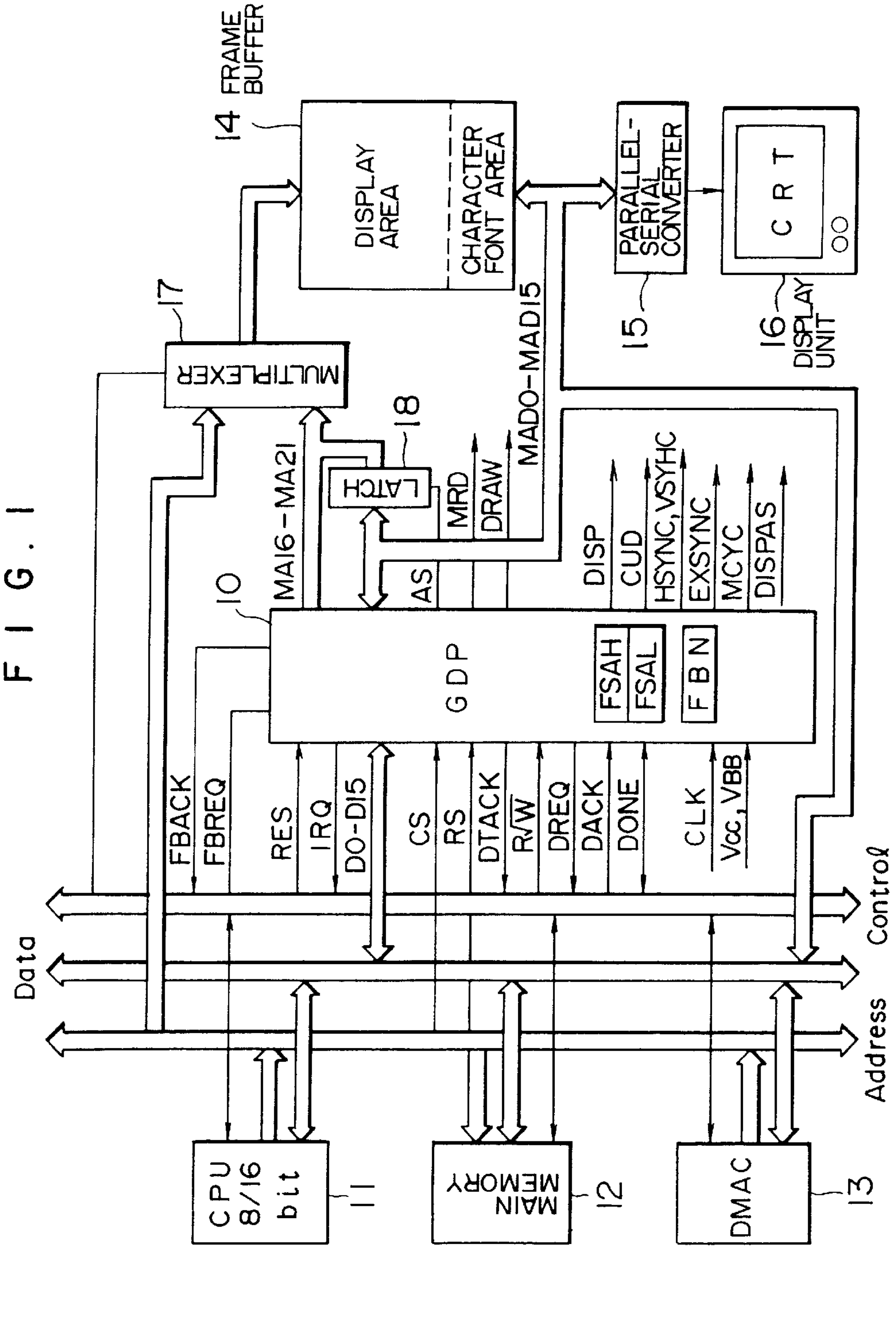
FIG. 1 is a block diagram showing the construction of a graphic processing system according to an embodiment of the invention.

Reference should first be made to FIG. 1 schematically showing the entire construction of a graphic processing system according to a preferred embodiment of the invention. The graphic processing system comprises a graphic data processor (GDP) 10, a central processing unit (CPU) 11, a main memory 12, a direct memory access controller (DMAC) 13, a frame buffer 14, a parallel-serial converter 15, a display unit (CRT) 16 which is an output, a multiplexer 17, and a latch 18.

The CPU 11 executes and processes programs stored in the main memory 12 to manage and control the complete system. The DMAC 13 controls direct memory access between the main memory 12 and the GDP 10 or between the main memory 12 and another input/output unit such as a printer (not shown). The GDP 10 receives a command and parameter information transferred from the CPU 11 or main memory 12 and accesses the frame buffer 14 in accordance with a predetermined processing procedure to generate and transfer characters and graphic data. The GDP 10 also plays the part of generating a sync timing signal which controls the display unit 16 and of controlling read-out of information to be sequentially displayed from the frame buffer 14 in synchronism with a given timing. Display data read out of the frame buffer 14 in parallel is converted by the parallel-serial converter 15 into a high speed serial signal and sent to the display unit 16 of, for example, a CRT, liquid crystal, EL or ECD so as to be displayed on its screen. The multiplexer 17 switches the supply of an address to the frame buffer 14 so that the address is fed from either an address bus connected to the GDP 10 or an address bus connected to the CPU 11. The latch 18 is adapted to fetch only address information from composite information of address and data.

Especially, in this embodiment, the frame buffer 14 is configured to include both a display area, serving as a first area, for storing data corresponding to individual pixels within at least one screen of the display unit and a character font area, serving as a second area, for storing character font data for at least one screen. The GDP 10 includes registers for storing the font area start address (FSAH, FSAL) and a register for storing the total number of bits (FBN) constituting one character, so that with a parameter transferred from the CPU 11 or main memory 12 through a data bus of the system, an address at which a corresponding character pattern is stored can be generated by designating a particular number to each coded character. This function permits speed-up of character processing as will be detailed below.

Figure 2:
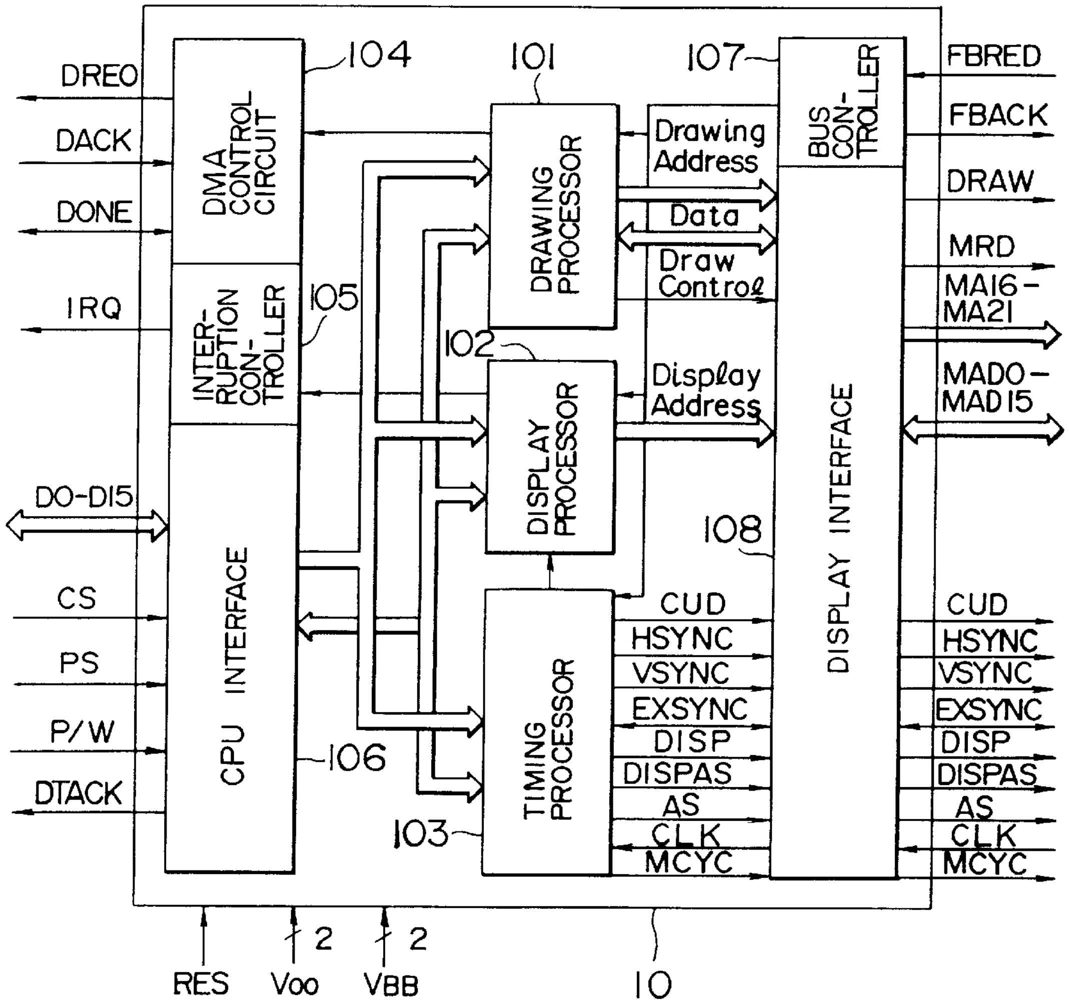
FIG. 2 is a block diagram showing the internal construction of a graphic drawing processor.

FIG. 2 shows the internal construction of the GDP 10. Thus, the GDP 10 comprises a drawing processor 101, a display processor 102, a timing processor 103, a CPU interface 106, an interruption controller 105, a direct memory access (DMA) control circuit 104, a display interface 108, and a bus controller 107. The drawing processor 101, adapted to control generation of graphics such as line and plane and data transfer between the CPU 11 and the display area corresponding to the frame buffer 14, delivers out a drawing address for read/write of the display area 14. The display processor 102 delivers out display addresses of the display area of frame buffer 14 data which are sequentially displayed in accordance with raster scanning. The timing processor 103 generates various timing signals such as a sync signal and a display timing signal for the CRT 16 as well as a signal for switching display and drawing. The CPU interface 106 serves for interface between the CPU 11 and GDP 10 such as synchronization between a CPU data bus and the GDP 10. The interruption controller 105 generates an interruption request signal (IRQ) to the CPU 11. The DMA control circuit 104 controls exchange of control signals between the DMAC 13 and the circuit 104. The display interface 108 serves for interface between the frame buffer and display unit such as control of switching between display and drawing addresses. The bus controller 107, control the accessing of a bus for the frame buffer 14, and also controls a access to the bus based on an external request signal. In this GDP 10, three processors, that is, the drawing, display and timing processors each have a distributed function and operate in parallel to improve processing efficiency.

Figure 3:
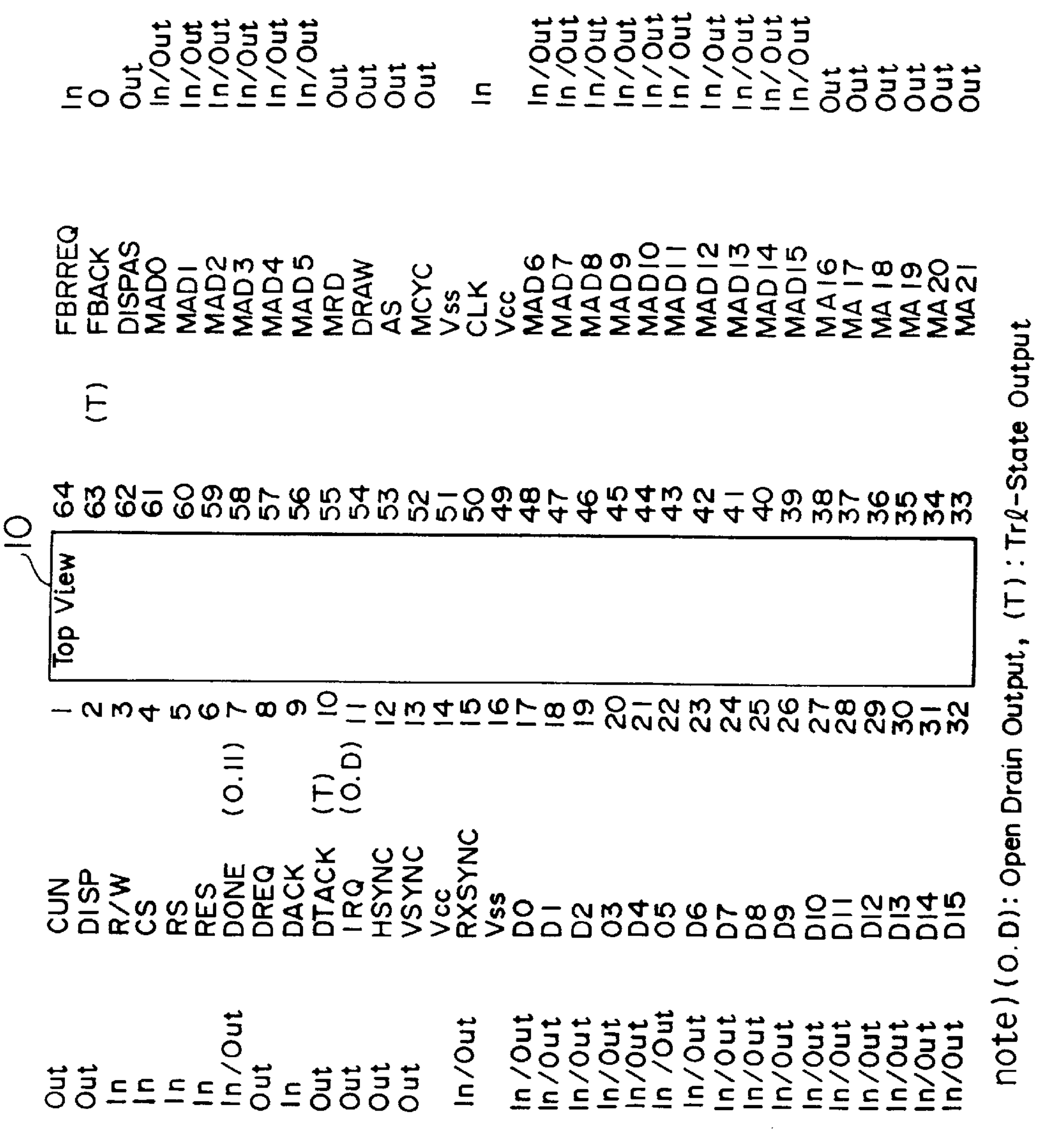
FIG. 3 is a diagram illustrative of a terminal layout of the graphic drawing processor.

FIG. 3 shows a layout of terminals of the GDP 10 shown in FIG. 2. Individual-terminals function as follows.

(1) Power Source Terminals (Vcc, Vss)

Terminals for supply of power to the GDP 10. Terminals Vss are grounded and terminals Vcc are applied with +5V.

(2) For input/output of system data buses (D0 to D15)

The D0 to D15 signals are input/output signals used for data transfer between a processing system including the CPU 11 and the GDP 10. Selection between 8-bit interface and 16-bit interface is permissible to comply with the data bus width of the processing system.

(3) For Input of Read/Write ($R/\overline{W}$)

The $R/\overline{W}$ signal is an input signal for controlling the direction of data transfer between the processing system including the CPU 11 and the GDP 10. When the $R/\overline{W}$ signal is at a "High" level, the data transfer is directed from GDP 10 to CPU 11 and when the $R/\overline{W}$ signal is at a "Low" level, the data transfer is directed from CPU 11 to GDP 10. In DMA transfer, however, transfer is from main memory 12 to GDP 10 when the $R/\overline{W}$ signal is high and from GDP 10 to main memory 12 when the $R/\overline{W}$ signal is low.

(4) For Input of Chip Select ($\overline{CS}$)

The $\overline{CS}$ signal is an input signal which the CPU 11 uses to access the GDP 10. With the $\overline{CS}$ signal being at "Low", read/write of the internal registers of the GDP 10 is permitted to execute.

(5) For Input of Register Select (RS)

The RS signal is an input signal for selection of the internal registers of the GDP 10. When the RS signal is at the "Low" level, the address register is selected with the $R/\overline{W}$ signal being at the "Low" level whereas the status register is selected with the $R/\overline{W}$ signal being at the "High" level. When the RS signal is at the "High" level, a control register designated by the address register is selected.

(6) For Output of Data Transfer Acknowledge ($\overline{DTACK}$)

The $\overline{DTACK}$ signal is an output signal indicative of completion of the data transfer and used as a transfer control signal in asynchronous bus interface.

(7) For Input of Reset ($\overline{RES}$)

The $\overline{RES}$ signal is an input signal for resetting the internal status of the GDP 10. By inputting a $\overline{RES}$ signal at the "Low" level, the upper two bits of the status register (SR) and the operation mode register (OMR) and the command control register (CCR) are initialized. The other internal registers are not affected.

(8) For Output of Interruption Request (IRQ)

The IRQ signal is an output signal for informing the CPU of ending of a command processing and detection of an undefined command.

(9) For output of DMA transfer request (DREQ)

The DREQ signal is an output signal for sending a data transfer request to the DMAC 13 when executing data transfer in the DMA transfer mode. The DREQ signal is generated by executing a DMA transfer command or by setting a DMA transfer mode bit (CDM) of the command control register to "1". In the DMA transfer mode, either one of two modes, a cycle steal mode and a burst mode, can be selected by setting a DMA transfer request control bit (DRC) of the command control register.

(10) For Input of DMA Transfer Request Acknowledge (DACK)

The DACK signal is an input signal from the DMAC 13 responsive to the DREQ signal. When the DACK signal is at the "Low" level, the GDPAO recognizes the R/W signal being in opposite polarity with respect to usual access. The DACK signal is also used to set the interface mode of the data bus after resetting into the GDP 10. If the DACK is high when the RES signal rises from low to high, the 16-bit interface is set and thereafter the D0 to D15 signals are used for data transfer between the GDP 10 and the CPU 11. If the DACK signal is low, the 8-bit interface is set and thereafter only the D0 to D7 signals are used and the signals D8 to D15 are made invalid. In the 16-bit interface mode, the automatic increment mode of the address register becomes +2 increment (only even addresses) and in the 8-bit interface mode, it becomes +1 increment.

(11) For Input/Output of Done (DONE)

The DONE signal is an input/output signal indicative of end of the DMA transfer. During execution of the DMA data transfer, the DONE signal becomes an output signal and becomes the "Low" level at the termination of the DMA transfer. During execution of the DMA command/parameter transfer, the DONE signal becomes an input signal for reception of a data transfer termination signal from the DMAC 13.

(12) For Input of Clock (CLK)

The CLK signal is a clock input signal to which the internal operation of the GDP 10 is referenced. The CLK signal has a frequency which is n times (n being programmable) the memory access timing frequency (memory cycle) and is fed from an external high speed dot timing circuit.

(13) For Output of Vertical Sync (VSYNC)

The VSYNC signal is an output signal for applying vertical synchronization to the CRT display unit 16.

(14) For Output of Horizontal Sync (HSYNC)

The HSYNC signal is an output signal for applying horizontal synchronization to the CRT display unit 16. When a start bit (STR), mentioned hereinafter, to be described later is set to "0" or a RAM mode bit (RAM), mentioned hereinafter, to be described later is 1 set to "0" in the operation mode register, the HSYNC signal becomes an output signal indicating that terminals for memory address/data (MAD), mentioned hereinafter, to be described later output a refresh address.

(15) For Input/Output of External Sync (EXSYNC)

The EXSYNC signal is an input/output signal for parallel operations of a plurality of GDP's 10 or a synchronous operation of an external apparatus such as another CRT controller or a video device and the GDP 10. Where the GDP 10 is used as a master device which supplies a reference signal for the synchronous operation (when a master/slave bit (M/S), mentioned hereinafter, to be described later of the operation mode register is "1"), the EXSYNC signal becomes an output signal. In the non-interlace mode, the VSYNC signal is branched and used as the EXSYNC output signal. In the interlace sync mode or the interlace sync and video mode, the VSYNC signal for odd fields is branched and used as the EXSYNC output signal. Where the GDP 10 is a slave device which operates in accordance with a reference signal supplied from an external apparatus, the EXSYNC signal becomes an input signal. In the non-interlace mode, the VSYNC signal is branched and used as the EXSYNC input signal for synchronous operation. In the interlace sync mode or the interlace sync and video mode, the VSYNC signal for odd fields is branched and used as the EXSYNC input signal for synchronous operation.

(16) For Output of Memory Cycle (MCYC)

The MCYC signal is an output signal indicative of an access timing for the frame buffer of the GDP 10. The MCYC signal becomes low when the GDP 10 is in the address cycle and becomes high when the GDP 10 is in the data cycle.

(17) For Output of Address Strobe (AS)

The AS signal is an output signal of latch timing for a display memory address. When the AS signal is at the "Low" level, an address can be separated by latching the output signal of the MAD15–MAD0 terminal. The AS signal is also used as a selection signal for loading data read out of the frame buffer 14 during the display cycle period to the parallel-serial converter (shift register) 15.

(18) For Output of Memory Read (MRD)

The MRD signal is an output signal for controlling the direction of data transfer between the GDP 10 and the display memory. Specifically, when the MRD signal is high, the frame buffer 14 is read by the GDP 10 and when low, the frame buffer 14 is written.

(19) For Output of Draw (DRAW)

The DRAW signal is an output signal to indicate whether the GDP 10 is in the drawing cycle or in the display cycle. When the DRAW signal is low, the GDP 10 is placed in the drawing cycle, and the MAD15–MAD0 signal becomes a multiplexed signal of a drawing address and a drawing data. When the DRAW signal is high, the GDP 10 is placed in the display cycle and the MAD terminal delivers a display address during the address cycle period.

(20) For Input/Output of Memory Address/Data (MAD15 to MAD0)

The MAD signal is a multiplexed input/output signal consisting of an address (lower 16 bits) of the frame buffer 14 and a data (16 bits). During the "Low" level period of the AS signal, the MAD terminal delivers the address. During the DRAW signal being low and the AS signal being high, the MAD terminal becomes a bidirectional data bus of 16 bits for input/output of the drawing data. When the RAM bit of the operation mode register is set with "0", the MAD terminal delivers a refresh address of 8 bits during the HSYNC signal being low.

(21) For Output of Memory Address (MA21 to MA16)

The MA signal is an output signal indicative of a memory address (upper 6 bits).

(22) For Output of Display Timing (DISP)

The DISP signal is an output signal indicative of a display period of the screen.

(23) For Output of Cursor Display ($\overline{CUD}$)

The $\overline{CUD}$ signal is an output signal for display of a cursor on the CRT screen.

(24) For Input of Frame Memory Bus Request ($\overline{FBREQ}$)

The $\overline{FBREQ}$ signal is an input signal for requesting use of the bus which permits the processing system including the CPU 11 to directly, not through the GDP 10, access the frame buffer 14. When the $\overline{FBREQ}$ signal becomes low, the GDP 10 releases only the drawing cycle.

(25) For Output of Frame Buffer Bus Request Response ($\overline{FBACK}$)

The $\overline{FBACK}$ signal is an output signal responsive to the $\overline{FBREQ}$ signal. This output signal becomes low, indicating that the GDP 10 has released the bus.

(26) For Output of Display Address Strobe ($\overline{DISPAS}$)

In a system using a graphic dual port memory as frame buffer memory 14, the $\overline{DISPAS}$ signal is outputted as a timing signal adapted to latch an address signal for display. When the $\overline{DISPAS}$ signal is at the "Low" level, the GDP 10 delivers the display address.

Figure 4:
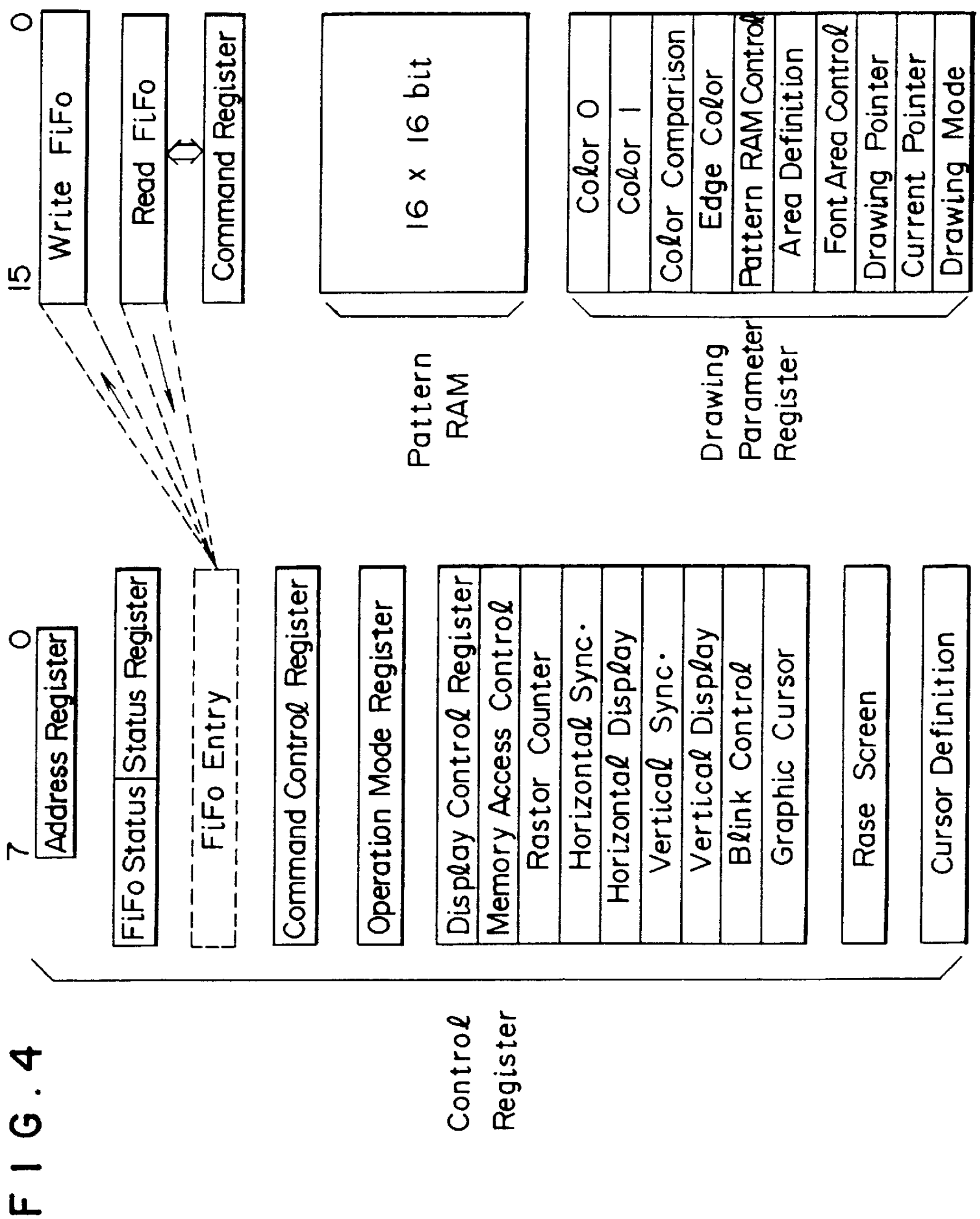

FIG. 4 shows a list of control registers and a random access memory (RAM) within the GDP 10 which are accessible from the CPU 11. These internal registers may be accessed in two ways as below.

(1) Registers Accessible Directly from the CPU

FIG. 5 lists up specified registers and a RAM directly accessible from the CPU 11. With both the RS and $\overline{CS}$ signals being at the "Low" level, an address register (write only) and a status register (read only) are permitted for accessing. During writing, the address register is selected and during reading, the status register is selected. In FIG. 5, the other registers than the address register and status register are accessed for read/write when the RS signal becomes high and the CS signal becomes low after a register number is designated by the address register.

(2) Registers Accessible By Way of FIFOs

Registers and RAM for control of drawing are accessed by way of FIFOs (first in first out). A write FIFO of 8 words and a read FIFO of 8 words are employed. When a FIFO entry is designated by the address register to execute a write operation, write to the write FIFO is established and when a read operation is executed, read from the read FIFO is established. As a command is written into the write FIFO, the write FIFO handles the command and each time one command processing ends, the next command is transferred to a command register. A pattern RAM is accessed by a WPTN (write pattern RAM) command and an RPTN (read pattern RAM) command. A drawing parameter register is accessed by a WPR (write parameter register) command and an RPR (read parameter register) command. FIG. 6 details the construction of the drawing parameter register.

The function of each register will now be described with reference to FIG. 5.

(1) Address Register AR

The address register (AR) is a write only register adapted to designate addresses ($00 to $FF) of a control register included in the GDP 10. $ means hexadicimal notation. When writing or reading the control register, it is necessary that an address of that control register be first written into the AR. By executing the writing when the RS and $\overline{CS}$ signals are at the "Low" level, the AR can be selected.

In the 16-bit interface mode, the lowermost bit of the AR is neglected and the AR always has word addresses. In the 8-bit interface mode, even addresses of the AR represent "High" byte data of the control register and odd addresses of the AR represent "Low" byte data.

When the AR has addresses covering R80 to RFF, the contents of the AR is automatically incremented by +1 (during the 8-bit interface) or by +2 (during the 16-bit interface) in response to read or write of the control register. Therefore, a control register having consecutive addresses can be accessed by merely executing the initial write of the head address of the control register to the AR.

(2) Status Register SR

The status register (SR) is a read only register indicative of the internal status of the GDP 10. By executing the reading when both the RS and $\overline{CS}$ signals are at the "Low" level, the SR can be selected. A FIFO status represents the number of words writable into the write FIFO. Each of the lower 8 bits of the SR being set to "1" has the following meaning. When the individual bits excepting bit 4 are set to "1", there occurs an interruption generating factor. An interrupt enable bit of the command control register then controls generation of an interruption.

◎ Command Error CER (Bit 7)

Indicates that an undefined command or an invalid parameter has been detected. The CER is cleared by setting an ABT (abort) bit to "1".

◎ Area Detect ARD (Bit 6)

Indicates that an area has been detected in accordance with designation for the drawing area test mode. The ARD is cleared by executing a read parameter register (RPR) command or by setting the ABT bit to "1".

◎ Command End CED (Bit 5)

Indicates that execution of a command has ended or the command is not executed. The CED is cleared by writing the command into the write FIFO.

◎ Edge Detect EGD (Bit 4)

Indicates that an edge color has been detected by an SRCH command or a TDOT command. The EGD is cleared by writing the command into the write FIFO.

◎ Read FIFO Full RFF (Bit 3)

Indicates that the read FIFO has been filled with a data of 8 words (16 bytes) and execution of a data read command is no more possible. The RFF is cleared when the data is read out of the read FIFO.

◎ Read FIFO Ready RFR (Bit 2)

Indicates that the read FIFO has prepared for data. The RFR is cleared when the data are all read out of the read FIFO.

◎ Write FIFO Ready WFR (Bit 1)

Indicates that write to the write FIFO is possible. The WFR is cleared when a data of 8 words (16 bytes) is written into the write FIFO.

◎ Write FIFO Empty WFE (Bit 0)

Indicates that the write FIFO is empty. The WFE is cleared by writing a data into the write FIFO.

(3) FIFO Entry FE

A FIFO entry (FE) is a register for writing a command/parameter into the GDP 10 and for reading a data from the GDP 10. The GDP 10 incorporates a read FIFO of 16 bytes and a write FIFO of 16 bytes. When a FIFO entry address is set into an address register and reading is executed, the read FIFO is selected and when a FIFO entry address is set into the address register and writing is executed, the write FIFO is selected. Commands are sequentially executed by writing a command/parameter into the write FIFO and after execution of a read command, the read FIFO sequentially prepares for read data.

In the 16-bit interface mode, the FIFO entry address is set into the address register for read/write in unit of word. In the 8-bit interface mode, the FIFO entry address is set into the address register so that when writing, data is written in the order of a high byte and a low byte and when reading, data is read in the order of a high byte and a low byte.

During transfer of a direct memory address (DMA), a read/write FIFO is selected irrespective of the contents of the address register.

(4) Command Control Register CCR

A command control register (CCR) is a readable/writable register for controlling the command processing and permission/inhibition of an interruption. Set in the interruption request enable bit within the CCR are seven types of permission/inhibition of interruption request corresponding to seven interruption factors of the status register. By setting "0" into a bit corresponding to a bit position of the status register, an interruption request is inhibited and by setting "1", an interruption request is permitted. Accordingly, by setting interrupt enable bits (IE), interruption request conditions complying with the system can be set. When the CCR is supplied with the RES signal, its ABT bit is initialized to "1" and the remaining bits to "0".

◎ Abort ABT (bit 15)

| ABT | |
|---|---|
| 0 | Permits command execution processing. |
| 1 | Interrupts a command processing presently in course of execution and clears the read FIFO and write FIFO. Since accessing to the read FIFO or write FIFO is inhibited, it is necessary that the ABT be set to "0" and thereafter a command be written. With the ABT bit set to "1", the status register is also initialized. |

◎ Pause PSE (bit 14)

| PSE | |
|---|---|
| 0 | Permits command execution processing and restarts the execution processing. |
| 1 | A command processing presently in course of execution is temporarily paused and placed in waiting until the PSE becomes "0" . Accessing to the status reqister and the FIFO is not affected. |

◎ Data DMA mode DDM (bit 13)

| DDM | |
|---|---|
| 0 | Set when the data DMA transfer is not effected. Note) Even if a DMA data transfer command is written, no DREQ signal is outputted. |
| 1 | Set when the data DMA transfer is effected. Setting is by all means necessary before a DMA data transfer command is written. |

◎ Command DAM mode CDM (bit 12)

| CDM | |
|---|---|
| 0 | Set for pausing the command DMA transfer or inhibiting the execution processing. |
| 1 | Restarts processing of the command DMA transfer. Even with a DRC bit (to be described below) set, transfer is executed in the cycle steal mode and hence the CPU 11 can access all of the registers of the GDP 10. The command DMA transfer can be stopped by clearing the CDM bit to "0" or by inputting the DONE signal. |

◎ DMA request control DRC (bit 11)

| DRC | |
|---|---|
| 0 | A "0" level signal of the DRC bit permits transmission of the DREQ signal (burst mode), where the DRC bit can be set to "0" only upon executing the data DMA transfer command. Since, with the data DMA transfer command, the DREQ signal is transmitted while the empty status of the read FIFO or write FIFO is managed internally, transfer of data of 8 words (16 bytes) at the most is effected in response to one request. |
| 1 | The DREQ signal is outputted as pulse signal each one word (byte). - cycle steal mode - |

◎ Graphic Bit Mode GBM (Bit 10 to Bit 8)

These GBM bits are used for setting a bit configuration of pixel data handled by the GDP 10. Either one of five kinds of bit configuration is selectable to realize, with ease, a color (graduation) configuration commensurate with a system.

◎ Interrupt Enable IE (Bit 7 to Bit 0)

When bits of the status register are set to "1" in accordance with IE bits, the IRQ signal is transmitted.

(5) Operation Mode Register OMR

The operation mode register (OMR) is a readable/writable register for setting an operation mode of the GDP 10. The OMR performs settings, important to the system, such as stop/start of the operation of GDP 10 and selection of mode of access to the frame buffer 14.

Upper two bits (M/S and STR) of the OMR are cleared to "0" by the $\overline{RES}$ input signal.

◎ Master/Slave M/S (Bit 15)

Where a plurality of GDPs 10 are operated in parallel or a GDP 10 is operated synchronously with another system such as another CRT controller or a television system, the master/slave bit (M/S) is used as a bit for setting the GDP 10 to be either a master device which is an originator of the sync timing signal of the system or a slave device which depends for operation upon the sync timing signal from another system.

| M/S | |
|---|---|
| 0 | Slave mode: The $\overline{EXSYNC}$ signal is placed in the input mode, and the internal operating timing of the GDP 10 is reset at a point where an external input signal changes from "Low" level to "High" level. Typically, the $\overline{VSYNC}$ signal is inputted as $\overline{EXSYNC}$ signal to enable the synchronous operation. But, where the raster scanning mode is set to the interlace sync mode or the interlace sync and video mode, it is necessary that only timings for odd fields be separated from the $\overline{VSYNC}$ signal and inputted as the $\overline{EXSYNC}$ signal. |
| 1 | Master mode: The $\overline{EXSYNC}$ signal is placed in the output mode. Where the raster scanning mode is set to the non-interlace mode, a signal in timed relationship with the $\overline{VSYNC}$ signal is outputted as $\overline{EXSYNC}$ signal. Where the raster scanning mode is set to the interlace sync mode or the interlace sync and video mode, only timings for odd fields are separated from the $\overline{VSYNC}$ signal and outputted as $\overline{EXSYNC}$ signal. Accordingly, where a plurality of GDPs are operated in parallel, the synchronous operation can be performed irrespective of the type of the raster scanning by interconnecting the terminals for $\overline{EXSYNC}$ signal. |

◎ Start STR (Bit 14)

The start bit (STR) is a bit for setting start/stop of the internal operation of the GDP 10.

| STR | |
|---|---|
| 0 | Stops or interrupts display and drawing operations. The $\overline{\text{DISP}}$, $\overline{\text{CUD}}$ and $\overline{\text{VSYNC}}$ signals are rendered high. Irrespective of setting of the RAM mode bit of the operation mode register (OMR), the $\overline{\text{HSYNC}}$ signal is rendered low and a dynamic RAM (DRAM) refresh address is outputted from the terminals for MAD. (Since access to the frame buffer 14 is inhibited during the DRAM refresh, no drawing processing becomes permitted. But, a command processing in course of execution is restarted when the STR bit is set to "1". Reception of commands is permitted.) |
| 1 | The display operation is started. Various control signals are outputted in accordance with the kind of setting of the screen area, and an interrupted drawing processing is restarted. |

◎ Access Priority ACP (Bit 13)

In course of accessing of the GDP 10 to the frame buffer 14, the ACP bit is used to set whether drawing is executed or not during the display period.

| ACP | |
|---|---|
| 0 | Display priority mode: During the display period, the GDP 10 interrupts the drawing processing. |
| 1 | Drawing Priority mode: The drawing processing is executed over the period excepting the DRAM refresh period. |

◎ Cursor Display Skew CSK (Bit 11 and Bit 10)

The cursor display skew bit (CSK) sets the amount of skew of the $\overline{\text{CUD}}$ signal in unit of memory cycle. By the skew function, the $\overline{\text{CUD}}$ signal is delayed within the LSI for a time necessary to access the frame buffer so as to be placed in phase with a serial video signal outputted from the parallel-serial video converter.

| CSK | | |
|---|---|---|
| 11 | 10 | |
| 0 | 0 | No skew |
| 0 | 1 | The $\overline{\text{CUD}}$ signal is skewed one memory cycle. |
| 1 | 0 | The $\overline{\text{CUD}}$ signal is skewed two memory cycles. |
| 1 | 1 | The $\overline{\text{CUD}}$ signal is skewed three memory cycles. |

◎ Display Skew DSK (Bit 9 and Bit 8)

The display timing skew bit (DSK) sets the amount of skew (delay) of the $\overline{\text{DISP}}$ signal in unit of memory cycle. The skew function has the same meaning as that of the cursor display skew.

| DSK | | |
|---|---|---|
| 9 | 8 | |
| 0 | 0 | The $\overline{\text{DISP}}$ signal is not skewed. |
| 0 | 1 | The $\overline{\text{DISP}}$ signal is skewed one memory cycle. |
| 1 | 0 | The $\overline{\text{DISP}}$ signal is skewed two memory cycles. |
| 1 | 1 | The $\overline{\text{DISP}}$ signal is skewed three memory cycles. |

◎ RAM Mode RAM (Bit 3 and Bit 2)

The RAM mode bit (RAM) sets the presence or absence of a DRAM refresh address to be outputted to elements of the frame buffer 14 used in the system. By setting the RAM bits to "0", a DRAM refresh address of 8 bits is outputted from the MAD terminals during the "Low" level period of the $\overline{\text{HSYNC}}$ signal.

| RAM | | |
|---|---|---|
| 3 | 2 | |
| 0 | 0 | Dynamic RAM mode: During the DRAM refresh period, the DRAM refresh address of 8 bits is outputted from the MAD terminals and drawing processing is not executed. |
| 0 | 1 | Video RAM mode: During the DRAM refresh period, the DRAM refresh address of 8 bits is outputted from the MAD terminals. The head address of a raster is also outputted as a display address once per raster. |
| 1 | 0 | Static: Set when a frame buffer 14 is used which does not require the supply of the DRAM refresh address from the GDP 10. Accordingly, even during the "Low" level period of the $\overline{\text{HSYNC}}$ signal, excepting the attribute output period, the drawing processing is executed. |
| 1 | 1 | Not used. |

◎ Graphic Address Increment Mode GAI (Bit 6 to Bit 4)

The GAI bits set a mode of increment of a display address output signal to a screen determined as a graphic screen setting in the frame buffer 14. If a data to be read out of one display cycle frame buffer is fixed as one word, the number of pixels which can be displayed per one word is four when a 4 bits/screen configuration is set by the GBM bits. Consequently, in order to make a display on a display unit such as a CRT display of definition equivalent to one bit/pixel or 16 pixels/word, the rate of the input clock to the GDP 10 must be quadrupled. Further, in applications of higher degree of multi-color/multi-gradation, a higher rate of clock is needed. Thus, to ensure compatibility with high-definition CRT display units without resort to higher rates of the input clock pulse to the GDP 10, a data of several words is read out of the frame buffer 14 at one display cycle. For example, where a 4 bits/pixel mode is set by the GBM bits, a 64-bit (4-word) data for 16 pixels is read out of the frame buffer 14 at one display cycle and the display address is counted up at the rate of +4 increment. For reading one word (16 bits) at one display cycle, "000" is set into the GAI bits. Where a data of 32 bits, 64 bits or 128 bits is desired to be read at one display cycle in a high-definition or multi-color/multi-gradation system, "001", "010" or "011" is set into the GAI bits.

| GAI | | | |
|---|---|---|---|
| 6 | 5 | 4 | |
| 0 | 0 | 0 | The display address of the display area is incremented at the rate of +1 per one display cycle. |
| 0 | 0 | 1 | The display address of the display area is incremented at the rate of +2 per one display cycle. |
| 0 | 1 | 0 | The display address of the display area is incremented at the rate of +4 per one display cycle. |
| 0 | 1 | 1 | The display address of the display area is incremented at the rate of +8 per one display cycle. |
| 1 | 0 | 0 | |
| 1 | 0 | 1 | No increment. |
| 1 | 1 | 0 | |
| 1 | 1 | 1 | The display address of the display area is incremented at the rate of +1 per two display cycles. |

◎ Frame Buffer Access Mode ACM (Bit 7)

To comply with the configuration of a system used, the GDP 10 accesses the frame buffer 14 for read/write in two access modes in accordance with the frame buffer access mode (ACM) bit. By setting the ACM bit, the operation of drawing processing can be selected during the display period.

| ACM 7 | |
|---|---|
| 0 | Single access mode: The frame buffer is accessed once during one display cycle. With the ACP bit set to "0", drawing is not permitted during the display period. |
| 1 | Dual access mode: The frame buffer is accessed twice during one display cycle. In order to establish a display cycle during the first half of the two accesses and to establish a drawing cycle during the second half, drawing is not permitted during the display period even if "0" is set into the ACP bit. |

◎ Raster Scan Mode RSM (Bit 1 and Bit 0)

The raster scanning mode of the GDP 10 is set in accordance with the RSM bits.

| RSM 1 0 | |
|---|---|
| 1 0 | |
| 0 0 | |
| 0 1 | Non-interlace mode |
| 1 0 | Interlace sync mode |
| 1 1 | Interlace sync and video mode |

Where the non-interlace mode is set, rasters for even fields and odd fields overlap together for scanning.

Where the interlace sync mode is set, rasters for odd fields scan so as to interpolate rasters for even fields. Scanning is controlled such that a character or graphic pattern displayed with the even field rasters is identical to that displayed with the odd field rasters.

Where the interlace sync and video mode is set, the same raster scanning as that of the interlace sync mode is effected but scanning is controlled such that a character or graphic pattern displayed with the even field rasters is different from that displayed with the odd field rasters.

(6) Display Control Register DCR

The display control register (DCR) is a readable/writable register for setting information indicative of display mode and attribute of the screen.

◎ Base Enable BE (Bit 14)

The base screen enable bit (BE) sets permission/inhibition of display of the base screen.

| BE | |
|---|---|
| 0 | Delivery of a display timing signal to the base screen is inhibited. But a base screen area defined by screen setting is reserved on the CRT screen. Because of inhibited delivery of the display address, drawing is permitted even within the base screen area. |
| 1 | The display timing signal and the display address are outputted to the base screen area defined by screen display. |

◎ Attribute Control Information ATR (Bit 7 to Bit 0)

The attribute control information (ATR) bits form a bit code of 8 bits for setting a desired code defined by the user. The ATR information is outputted from the MAD terminals MAD 7 to MAD 0 immediately before the $\overline{\text{HSYNC}}$ signal changes from "Low" level to "High" level. Since the ATR information is outputted for each raster, it can be utilized in an application for attribute control in unit of raster by dynamically rewriting the contents of the ATR bits. Namely, ATR is rewrited during display period.

◎ Memory Access Control Register MAC

Sets the access time of the frame buffer 14 during drawing in unit of the CLK input signal. By using this method, memory accessing can be controlled without reducing the internal processing speed.

(7) Raster Count Register RCR

The raster count register (RCR) is for storing a number of a raster (raster line) which the display unit currently scans. The CPU can read the RCR at a desired time to know the present scanning position.

(8) Horizontal Sync Register HSR

Sets the horizontal scanning synchronization (HC) and a horizontal sync signal pulse width (HSW) in unit of memory cycle.

(9) Horizontal Display Register HDR

Sets a horizontal display start position (HDS) and a horizontal display width (HDW). The distance between a rise edge of the $\overline{\text{HSYNC}}$ signal and a display start point is set as the display start position in unit of memory cycle number. The display width is also set in unit of memory cycle number.

(10) Vertical Sync Register VSR

Sets the vertical scanning synchronization (VC) in terms of the raster number.

(11) Vertical Display Register VDR

Sets a vertical sync pulse width (VSW), a vertical display start position (VDS) and a vertical display width (VDW) in terms of the raster number.

(12) Blink Control Register BCR

Sets the length of blink ON (B ON 1 bits) and that of blink OFF (B OFF 1 bits) in unit of four fields. By setting the BCR, a timing signal for blink as attribute information is outputted to the MA terminals MA 18 and MA 19 in synchronism with the rise of the $\overline{\text{HSYNC}}$ signal.

(13) Graphic Cursor Register GCR

Sets an X-axis display start position (CXS), an X-axis display end position (CXE), a Y-axis display start position (CYS) and a Y-axis display end position (CYE) of the graphic cursor. The X-axis direction (horizontal direction) is defined by the number of memory cycles counted from the rise of the $\overline{HSYNC}$ signal and the Y-axis direction (vertical direction) is defined by the number of rasters counted from the rise of the $\overline{HSYNC}$ signal.

(14) Memory Width Register MWR

Sets a memory width (MW) of a screen set on the display memory. The memory width is set in unit of memory address.

(15) Display Start Address Register SAR

Consists of an SAH of 4 bits and an SAL of 16 bits connected thereto and defines a display start address of 20 bits. By controlling the display start address, scrolling in each direction can be realized. A display start dot address (SDA) can also be set into the SAR and delivered to the MAD terminals MAD 8 to MAD 11, as information for controlling an external circuit adapted to effect horizontal smooth scrolling, in synchronism with the rise of the $\overline{HSYNC}$ signal. Based on this information, the external circuit controls load timing or load data for the parallel-serial converter to thereby perform the horizontal smooth scrolling.

(16) Cursor Definition Register CDR

Sets ON timing (CON) and OFF timing (COFF) for a cursor blink. Either of the CON and COFF timings sets the timing for a signal to be outputted to the $\overline{CUD}$ terminal in unit of 4-field period.

Referring now to FIG. 6, the function of the drawing parameter register will be described.

(1) Color 0 Register CL 0

Defines a drawing color corresponding to "0" of a drawing data stored in the pattern RAM.

(2) Color 1 Register CL 1

Defines a drawing color corresponding to "1" of a drawing data stored in the pattern RAM.

(3) Color Comparison Register CCMP

Defines an evaluation color for drawing operation. In a conditional drawing mode, the CCMP is used for defining a specified background color or a drawing inhibition color.

(4) Edge Color Register EDG

Defines an edge color for the search command (SRCH) and a test dot command (TDOT). Two modes are available one of which decides a designated color in the EDG to be an edge color and the other of which decides a different color from that designated in the EDG to be an edge color.

(5) A Pattern RAM Control Register PRC

Defines the size of the pattern RAM used for drawing and a start point of pattern RAM scanning. As a pattern area, a desired area of 16 dots×16 dots at the most can be set. A reference area of the pattern RAM used can be defined by pattern start position bits (PSX, PSY) and pattern end position bits (PEX, PEY) in the X and Y directions. In pattern zoom coefficient bits (PZX, PZY), zoom coefficients for pattern reference are defined. Pattern point bits (PPX, PPY) store the current reference point position of the pattern RAM and can be used to designate a desired reference start point before issuance of a drawing command. Pattern zoom count bits (PZCX, PZCY) indicate a count value of zoom rate for pattern reference.

(6) Area Definition Register ADR

Sets a drawing area which is defined by $XMIN \leqq X \leqq XMAX$ and $YMIN \leqq Y \leqq YMAX$.

(7) Font Area Start Address Register FSA

Sets a start address of a character font area in a system using a part of the frame buffer 14 as the character font area.

(8) Font Area Memory Width Register FAMW

Sets a memory width of the character font area.

(9) Font Bit Number Register FBN

Set the total number of bits of font constituting one character.

(10) Character Spacing Register CHS

Sets a spacing between adjacent characters in the X direction when characters are developed on the display area.

(11) Font Size Register FS

Sets the size of a character to be developed. The number of font bits in the X direction is set by FSX bits and the number of font bits in the Y direction is set by FSY bits.

(12) Drawing Pointer DP

The DP is a pointer which manages a linear address of a current drawing point. When executing a graphic drawing command, the DP moves when a current pointer (CP) to be described below moves. The DP manages a drawing number (DN), a drawing pointer address (DRAH, DPAL) and a drawing pointer bit address (DPB).

(13) Current Pointer CP

Indicates current drawing point coordinates X and Y.

(14) Drawing Mode Register DM

Sets a mode of drawing. There are available a drawing area detecting mode for drawing management of the frame buffer area, a color data developing mode, a color data operation mode, and a pel mode for defining the size of one pixel for line drawing.

Commands of the GDP 10 will now be described. Table 1 lists the commands.

TABLE 1

List of Commands

| Mnemonic | Name of Command | Format |
|---|---|---|
| ORG | Origin | ORG DPH, DPL |
| WPR | Write Parameter Register | WPR(RN)D |
| RPR | Read Parameter Register | RPR(RN) |
| WPTN | Write Pattern RAM | WPTN(PRA)n, D1, . . . , Dn |
| RPTN | Read Pattern RAM | RPTN(PRA)n |
| PUT | Put image Data | PUT Lx, Ly, D1, . . . , Dn |
| GET | Get image Data | Get Lx, Ly |
| AMOVE | Absolute Move | AMOVE X, Y |
| RMOVE | Relative Move | RMOVE dx, dy |
| ALINE | Absolute Line | ALINE X, Y |
| RLINE | Relative Line | RLINE dx, dy |
| ARCT | Absolute Rectangle | ARCT X, Y |
| RRCT | Relative Rectangle | RRCT dx, dy |
| APLL | Absolute Polyline | APLL(n)X1, Y1, . . . Xn, Yn |
| RPLL | Relative Polyline | RPLL(n)dX1, dY1, . . . dXn, dYn |
| APLG | Absolute Polygon | APLG(n)X1, Y1, . . . Xn, Yn |
| RPLG | Relative Polygon | RPLG(n)dX1, dY1, . . . dXn, dYn |
| AFRCT | Absolute Filled Rectangle | AFRCT X, Y |
| RFRCT | Relative Filled Rectangle | RRCT dx, dy |
| DOT | Dot | DOT |
| ELARC | Elliptic Arc | ELARC (SP, C) a, b, R, Xs, Ys, Xe, Ye |
| FEFAN | Filled Elliptic Fan | FEFAN (SP, C) a, b, R, Xs, Ys, Xe, Ye |
| FTRI | Filled Triangle | FTR1X1, Y1, X2, Y2 |
| ZOOM | Zoom | ZOOM (S, DSD) XS, YS, LSX, LSY, LDX, LDY |

TABLE 1-continued

List of Commands

| Mnemonic | Name of Command | Format |
|---|---|---|
| ROT | Rotation | ROT (1) XS, YS, LSX, LSY, LDX1, LDX2, LDY1, LDY2 |
| TEXT | Text | TEXT (n)CN1, . . . CNn |
| TEXTPS | Text with Proportional Spacing | TEXTPS (n) CCl, . . . CCn |
| APMV | Absolute Pointer Move | APMV X, Y |
| RPMV | Relative Pointer Move | RPMV dx, dy |
| SRCH | Search | SRCH (E, SD) EP |
| TDOT | Test Dot | TDOT (E) |
| COPY | Copy | COPY SX, YS, LX, LY |

Figure 7:
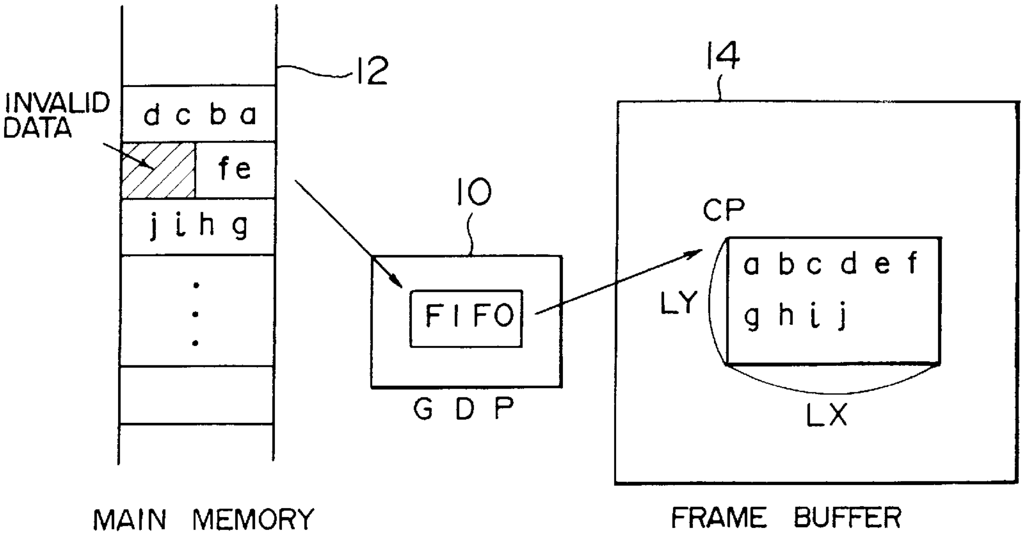
FIG. 7 is a diagram useful in explaining a put image data (PUT) command.

FIG. 7 illustrates an example of the operation of a PUT command. The PUT command is to transfer a data from the main memory 12 to a rectangular region representing pixels in the frame buffer 14. The rectangular region of the frame buffer 14 is defined by a rectangular by the coordnates of two diagonal points located at opposite corners of the rectangle. One of the points has coordinates designated by the current pointer CP and the other point has relative coordinates designated by parameters LX and LY. When transferring digital data, bits are aligned in row in the X direction. Therefore, if the number of bits indicated by the parameter LX is not a multiple of the number of bits representative of one word in the main memory 12, then an invalid data occurs as shown in FIG. 7.

Figure 8:
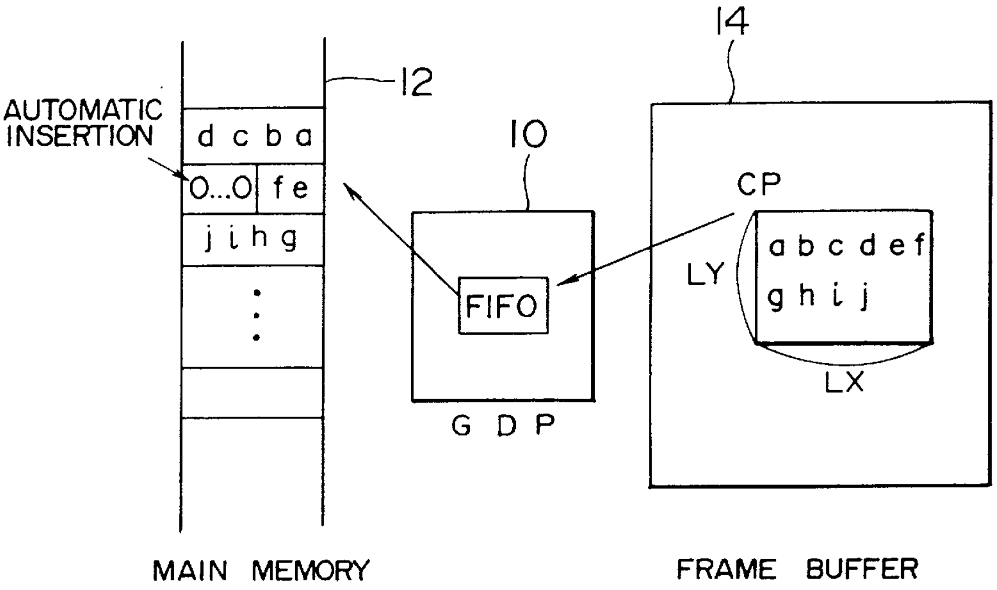
FIG. 8 is a similar diagram for a get image data (GET) command.

FIG. 8 shows an example of the operation of a GET command. The GET command is to transfer data from a rectangular region representing pixels in the frame buffer memory 14 to the main memory 12. The rectangular region of the frame buffer 14 is similarly defined as above as having two diagonal points one of which has coordinates designated by the current pointer CP and the other of which has relative coordinates designated by parameters LX and LY. When transferring digit as above the bits are aligned in a row in the X direction. Therefore, if the number of bits indicated by the parameter LX is not a multiple of the number of bits representative of one word in the main memory 12, then “0” is automatically inserted into the main memory as shown in FIG. 8.

Figure 9:
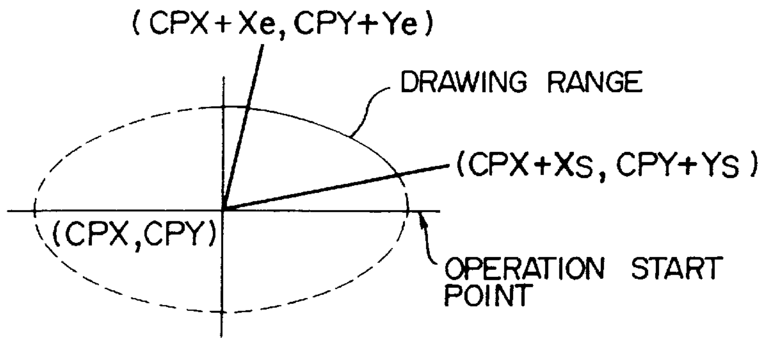
FIG. 9 diagrammatically explains an elliptic arc (ELARC) command.

FIG. 9 illustrates an example of the operation of an ELARC command. The ELARC command is for drawing an ellipse centered on coordinates CPX and CPY designated by the current pointer CP. A drawing region is defined by a line segment connecting the coordinates designated by the CP with relative coordinates designated by parameters Xs and Ys and a line segment connecting the coordinates designated by the CP with relative coordinates designated by parameters Xe and Ye. The maximum drawing region is defined by the major axis of the ellipse and the minor axis. As operation start points, one of four points on the major and minor axis of the ellipse are designated by parameters SP. The CPU 11 can read the drawing start point and the drawing end point by way of the FIFO.

Figure 10:
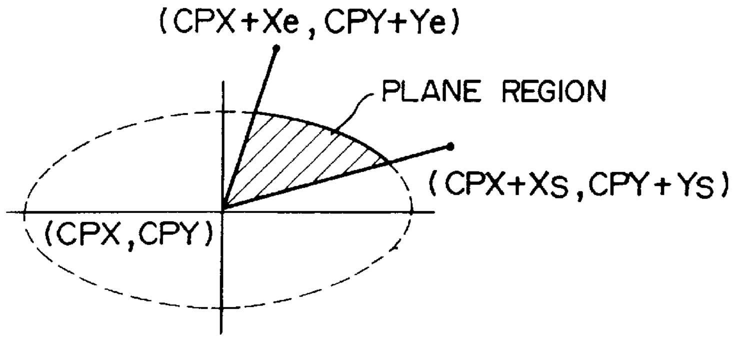
FIGS. 10 and 11 diagrammatically explain filled elliptic fan (FEFAN) commands.
Figure 11:
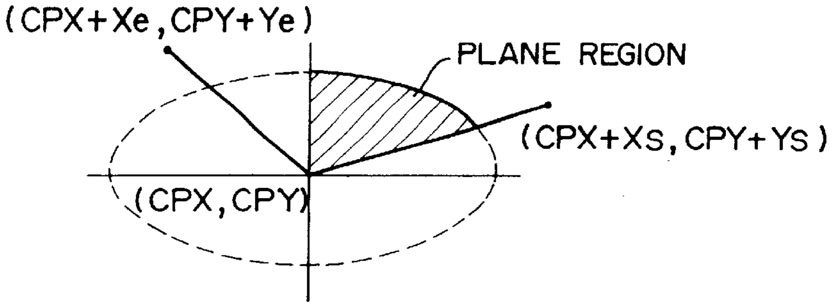

FIG. 10 exemplifies the operation of an FEFAN command which is for painting a fan centered on coordinates CPX and CPY designated by the CP by using a graphic image stored in the pattern RAM. This command contains parameters having the same meaning as that of the ELARC command. FIG. 11 depicts an example of the maximum drawing region defined by the fan obtained with this command FEFAN.

Figure 12:
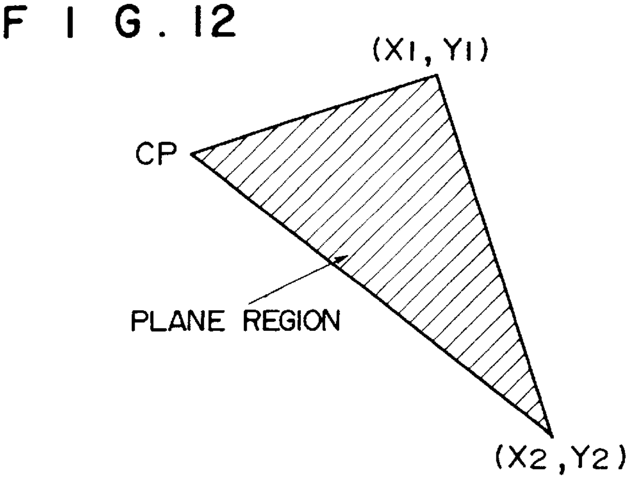
FIG. 12 diagrammatically explains a filled triangle (FTRI) command.

FIG. 12 exemplifies the operation of an FTR1 command. Using a graphic stored in the pattern RAM, the FTRl command paints a triangle having as apices three points defined by coordinates designated by the CP, absolute coordinates designated by parameters X1 and Y1, and absolute coordinates designated by parameters X2 and Y2. By using a number of the FTR1 commands in combination, a desired polygon can be filled with design patterns.

Figure 13:
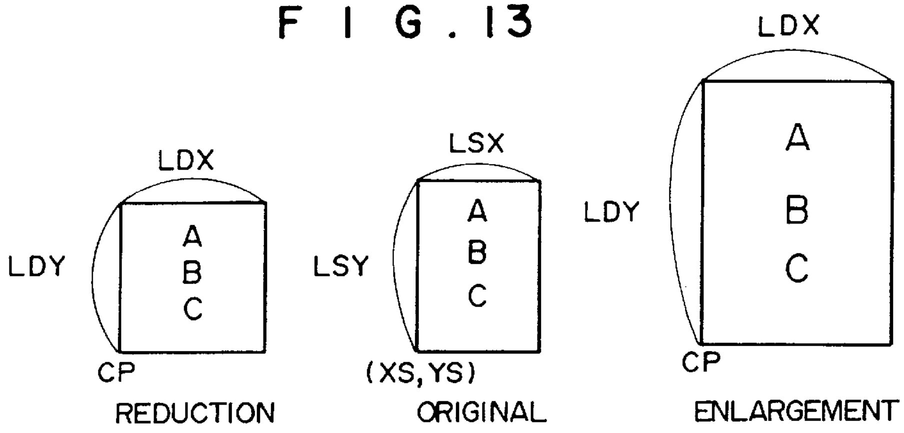
FIG. 13 is a diagram for explaining zoom (ZOOM) commands.

FIG. 13 exemplifies the operation of a ZOOM command. The ZOOM command is for transferring, with enlargement or reduction, a rectangular region having diagonal two points, one of which has absolute coordinates designated by parameters XS and XY and the other of which has coordinates relative to the absolute coordinates that are designated by parameters LSX and LSY, to a rectangular region having diagonal two points one of which has coordinates designated by the CP and the other of which has relative coordinates designated by parameters LDX and LDY. The magnification in the X direction is represented by the ratio between LSX and LDX, and the magnification in the Y direction is represented by the ratio between LSY and LDY. The X-direction magnification and the Y-direction magnification can be set independently of each other.

Figure 14:
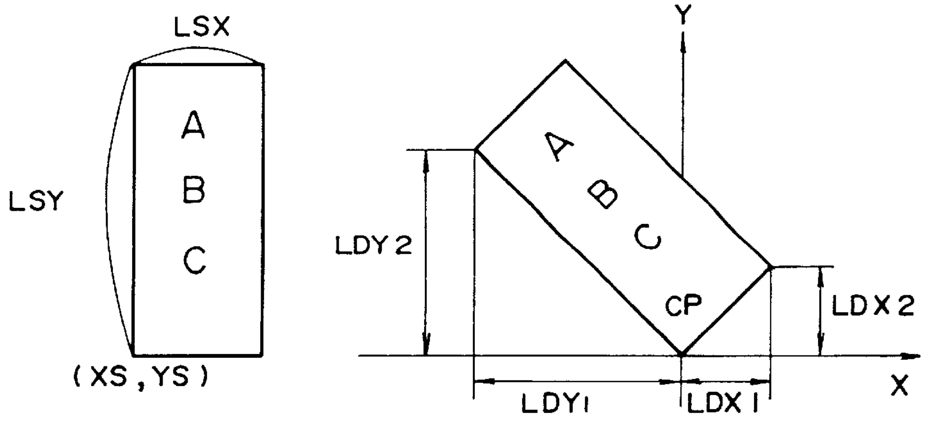
FIGS. 14 and 15 are diagrams for explaining a rotation (ROT) command.

FIG. 14 illustrates an example of the operation of an ROT command. The ROT command is to transfer, with rotation, a rectangular region having diagonal two points, one of which has absolute coordinates designated by parameters XS and YS and the other of which has coordinates relative to the absolute coordinates designated by parameters LSX and LSY, to a region defined by coordinates designated by the CP and parameters LDX 1, LDX 2, LDY 1 and LDY 2. Assuming that the rotation angle is θ, these parameters as indicated by the following equations are inputted:

LDX 1=LSX·cos θ

LDX 2=LSX·sin θ

LDY 1=−LSY·sin θ

LDY 2=LSY·cos θ

Figure 15:
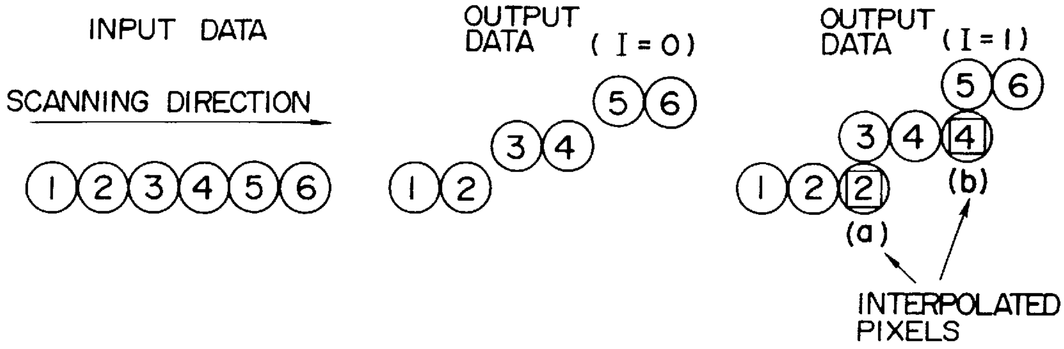

FIG. 15 illustrates an interpolation processing for the ROT command. For a parameter I being “0” (I=0), no interporation is performed. But for the parameter being “1” (I=1), when X and Y coordinates of a pointer for determining a coordinate position of transfer destination are both renewed, a pixel data at a coordinate X immediately preceding the renewed coordinate X is copied at the renewed coordinate X.

Figure 16:
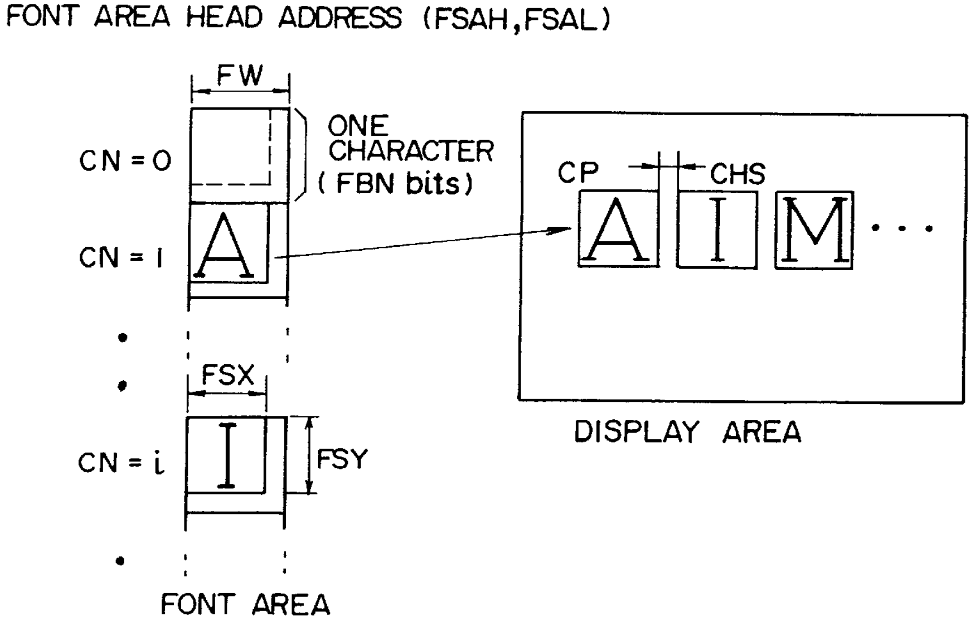
FIGS. 16 and 17 are diagrams for explaining a text (TEXT) command.

FIG. 16 illustrates an example of the operation of a TEXT command. The TEXT command is used in a system utilizing part of the frame buffer 14 as the character font area, for developing a character font data corresponding to an inputted command code at a position in the display area of frame buffer 14 which is designated by the current pointer. The internal registers of the GDP 10, that is, the registers FSAH and FSAL for setting a start address of a font area and the register FAMW for setting a memory width of the font area, registers FSX and FSY for setting widths of a character actually developed, a register FBN for setting the total number of bits for one character, and a register CHS for setting a spacing between adjacent characters in the X direction are all set in advance. Thereafter, the CPU 11 transfers the TEXT command and a parameter n representative of the number of characters to be developed, followed by sequential transfer of character codes CN representative of n characters. Then, the GDP 10 generates addresses of the individual character fonts corresponding to the character codes CN to develop them and transfers and writes pixel information of each corresponding character font pattern to a predetermined storing position in the display area of frame buffer 14 corresponding to a predetermined display position on the display unit 16.

Figure 17:
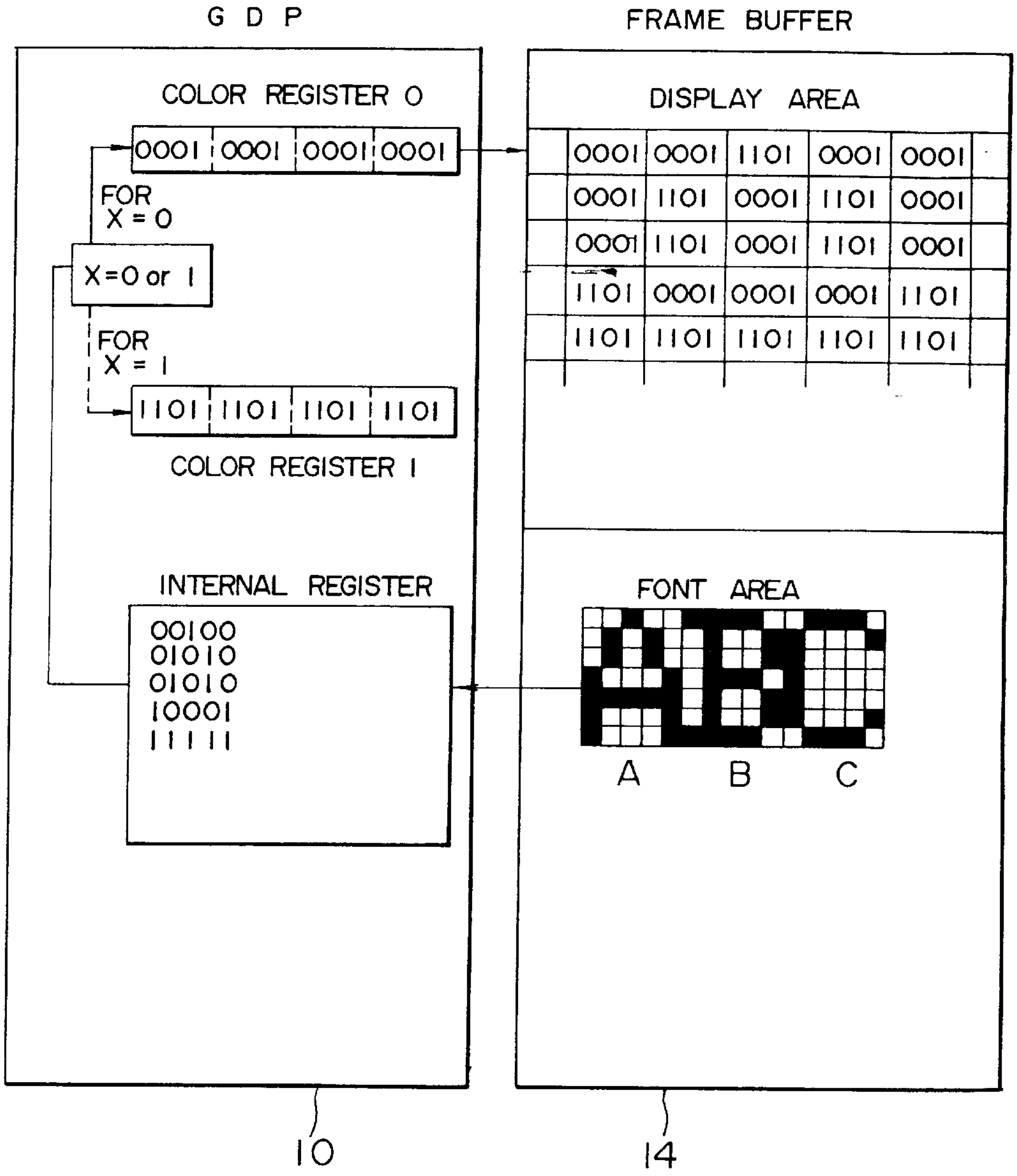

FIG. 17 shows an example of color development in the mode of the TEXT command. This example provides a method for converting a font data which is a binary data into a color data which is of multi-level information. A color register 0 and a color register 1 are internal registers of the GDP 10 and they are respectively set with a color data corresponding to "0" of the font data and a color data corresponding to "1" of the font data. The GDP sequentially retrieves the read font data and writes a color data corresponding thereto into the frame buffer 14.

Figure 18:
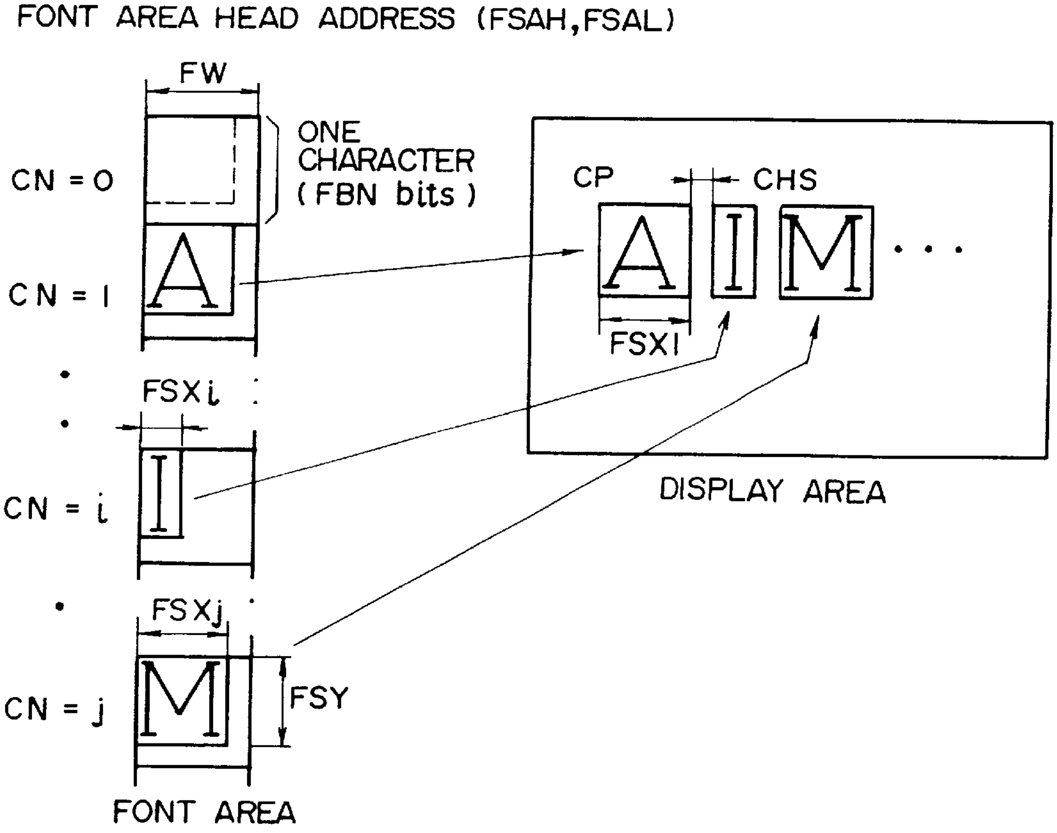
FIG. 18 is a diagram for explaining a text with proportional spacing (TEXTPS) command.

FIG. 18 exemplifies the operation of a TEXTPS command which sets, in addition to the function of the TEXT command, a development width of a character in the X direction. The development width is controlled by storing a code indicating a development width in the X direction into the upper byte of a parameter CC and a character code into the lower byte of the parameter CC.

Figure 19:
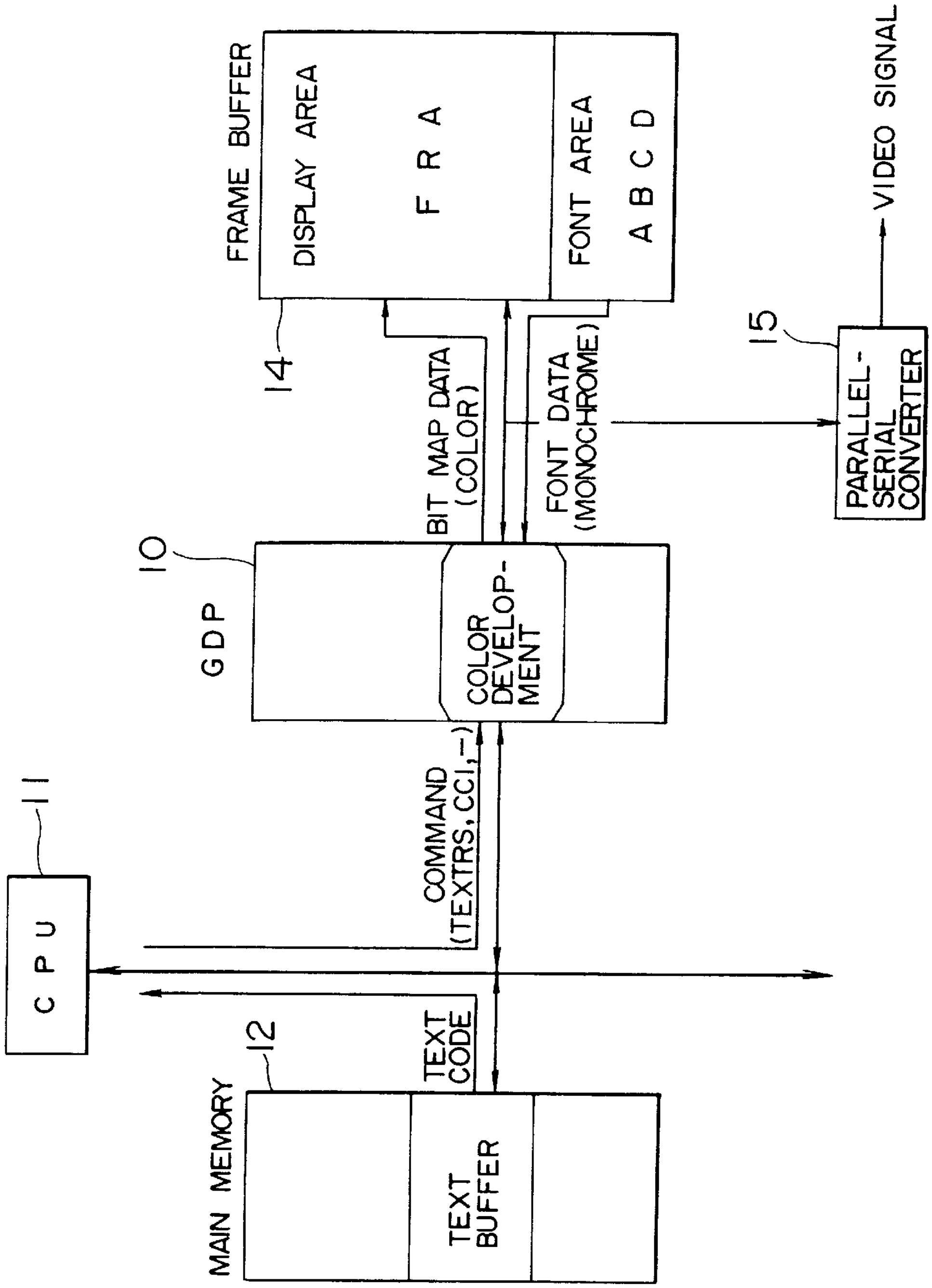
FIG. 19 is a schematic block diagram showing a system for character font development.

FIG. 19 schematically exemplifies a system for character font development by using the TEXT command or the TEXTPS command.

Figure 20:
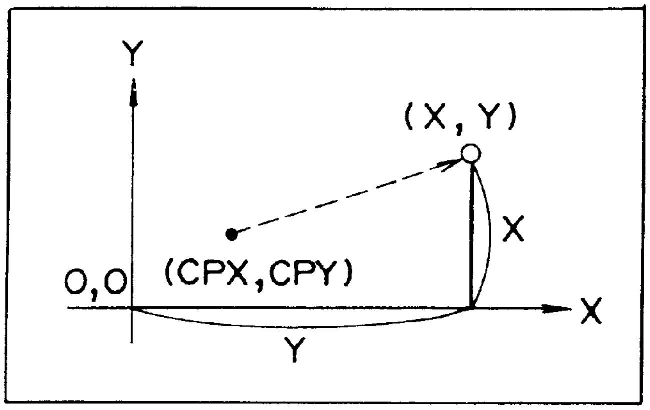
FIGS. 20 and 21 explain an absolute pointer move (APMV) command.
Figure 21:
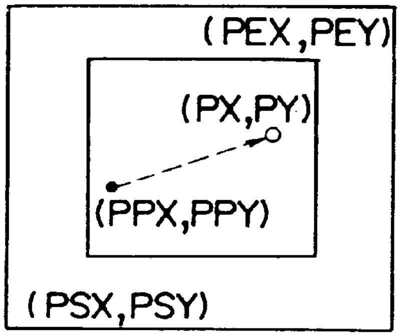

FIGS. 20 and 21 illustrate an example of the operation of an APMV command. Upon movement of the current drawing point designated by the CP to a point represented by absolute coordinates measured from the origin and designated by parameters X and Y, the APMV command is used to simultaneously move coordinates PPX and PPY designated by a pattern pointer to coordinates PX and PY designated by a reference point stored in the pattern RAM.

Figure 22:
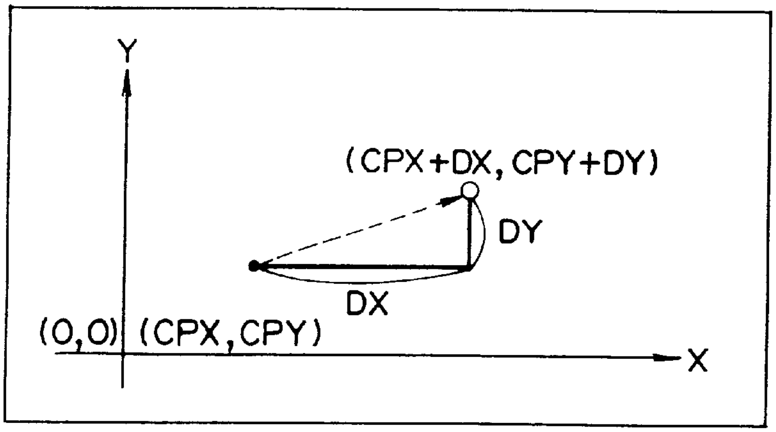
FIGS. 22 and 23 explain a relative pointer move (RPMV) command.
Figure 23:
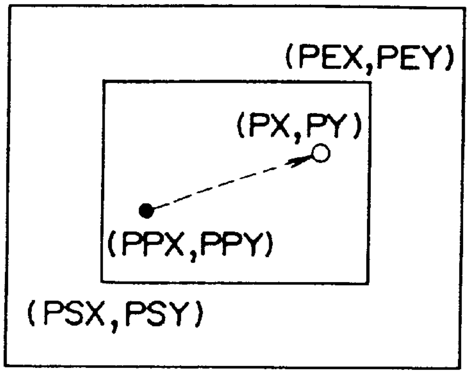

FIGS. 22 and 23 illustrates the operation of an RPMV command. Upon movement of the current drawing point designated by the CP to a point represented by coordinates relative to the CP coordinates which are designated by parameters dX and dY, the RPMV command is used to simultaneously move coordinates PPX and PPY designated by the pattern pointer.

FIG. 24 depicts scanning directions determined by an SRCH command. The SRCH command is subject to a parameter EP having the meaning as illustrated in FIG. 25. While moving coordinates designated by the CP and coordinates designated by the pattern pointer in a direction indicated by a parameter SD, the SRCH command detects an edge color designated by the parameter I and sets the detected point into the CP and pattern pointer. When the parameter I is "0", the edge color is identical to an edge color indicated by a data of the edge color register EDG and when the parameter I is "1", the edge color becomes a color different color from that indicated by the data of the register EDG. A parameter EP indicates limits imposed on scanning and is set with the maximum coordinate X of a scanning region during X-direction scanning and with the maximum coordinate Y of the scanning region during Y-drirection scanning.

FIG. 26 illustrates an example of the operation of a TDOT command. The TDOT command reads a color data indicated by the CP and causes a comparator in GDP 10 to compare that data with an edge value designated by the parameter I, thus setting a comparison result into the status register. When the parameter I is "0", the edge color corresponds to the data of the EDG register and when "1", the edge color corresponds to a different data from that of the EDG register.

Figure 27A:
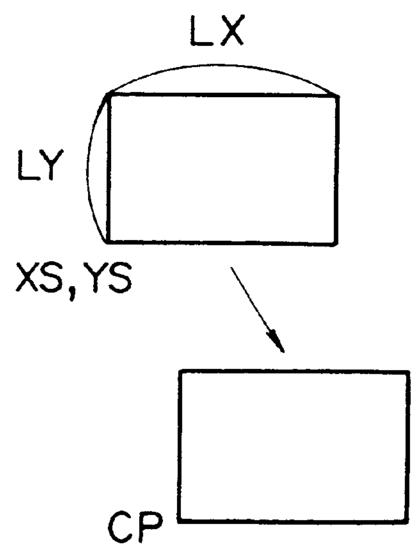
FIG. 27 explains, at sections (A) and (B), a copy (COPY) command.
Figure 27B:
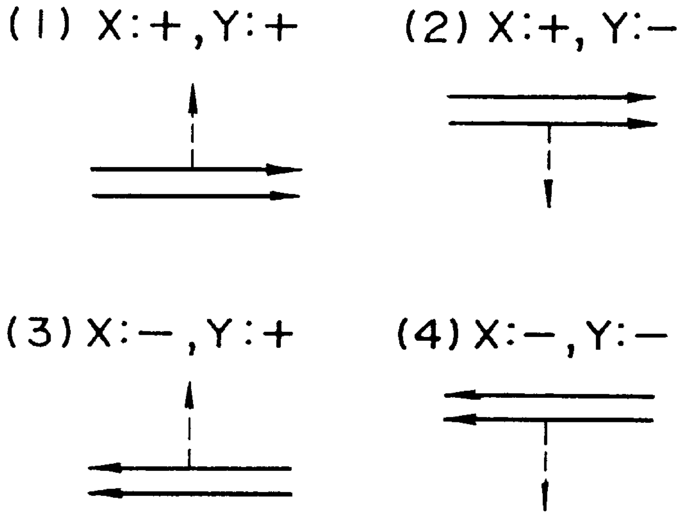
Figure 28:
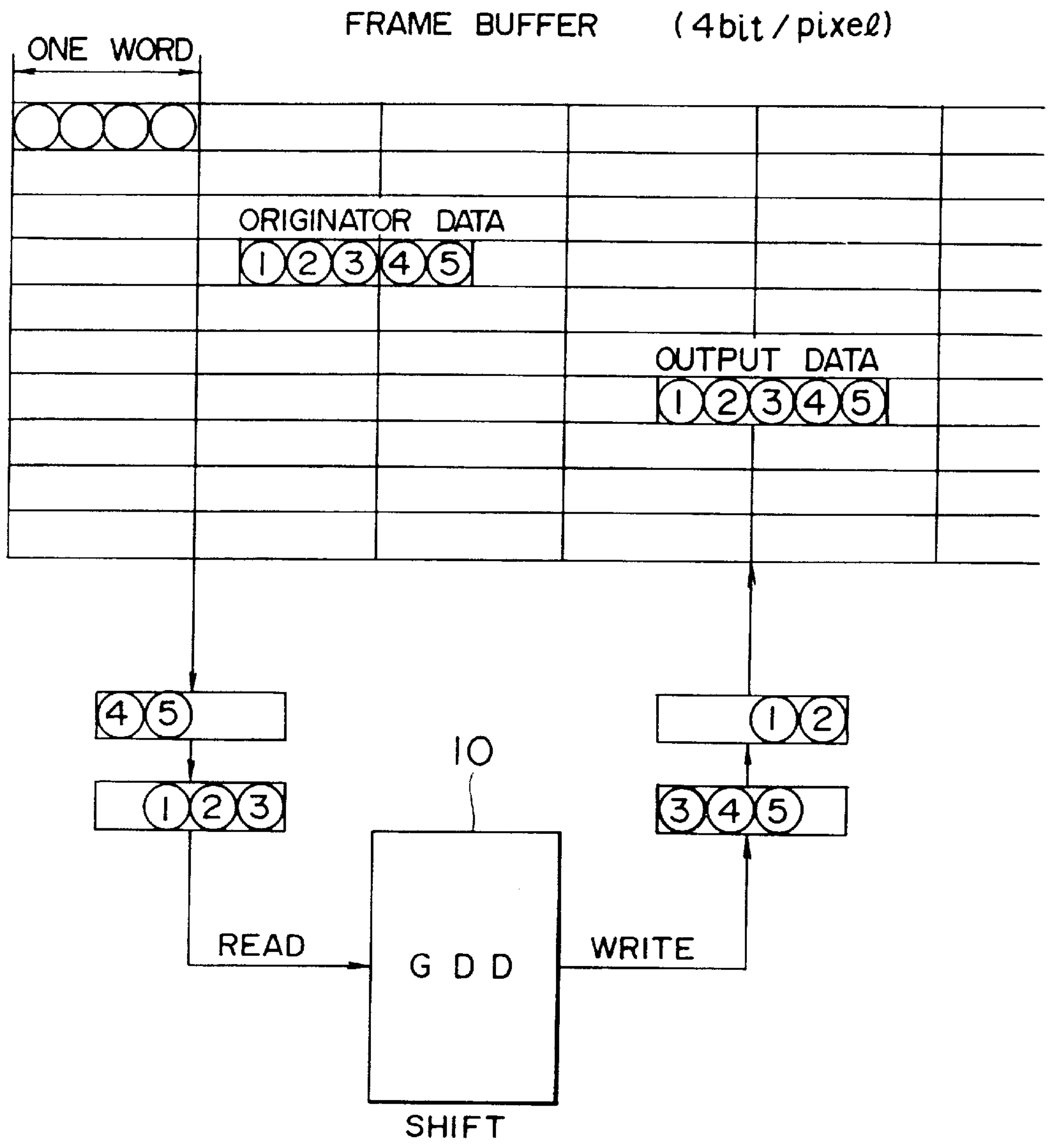
FIG. 28 is a diagrammatic representation illustrative of a transfer model based on the copy command.

FIG. 27 illustrates at section (A) an example of the operation of a COPY command. The COPY command is for copying, within the frame buffer 14, a data representative of a rectangular region being parallel with the coordinate axes and having diagonal two points, one of which has absolute coordinates relative to the origin designated by parameters XS and YS and the other of which has coordinates relative to the absolute coordinates designated by parameters LX and LY, to a rectangular region being parallel with the coordinate axes and having a start point designated by the CP. FIG. 27 illustrates at section (B) the scanning directions of the COPY command within the transfer originating region and the transfer destination region. The scanning directions are determined by signs of the parameters LX and LY and they are coincident with each other within the transfer originating and destination regions. FIG. 28 shows a transfer model in unit of word executable by the COPY command.

As has been described so far, the GDP 10 in accordance with the foregoing embodiment can handle the highly functional command system and greatly relieve the amount of processings charged on the CPU 11. This permits the graphic processing system to have facility of high performance. In addition, by providing the GDP 10 in the form of the LSI, cost reduction of the graphic processing system can also be ensured.

Figure 29:
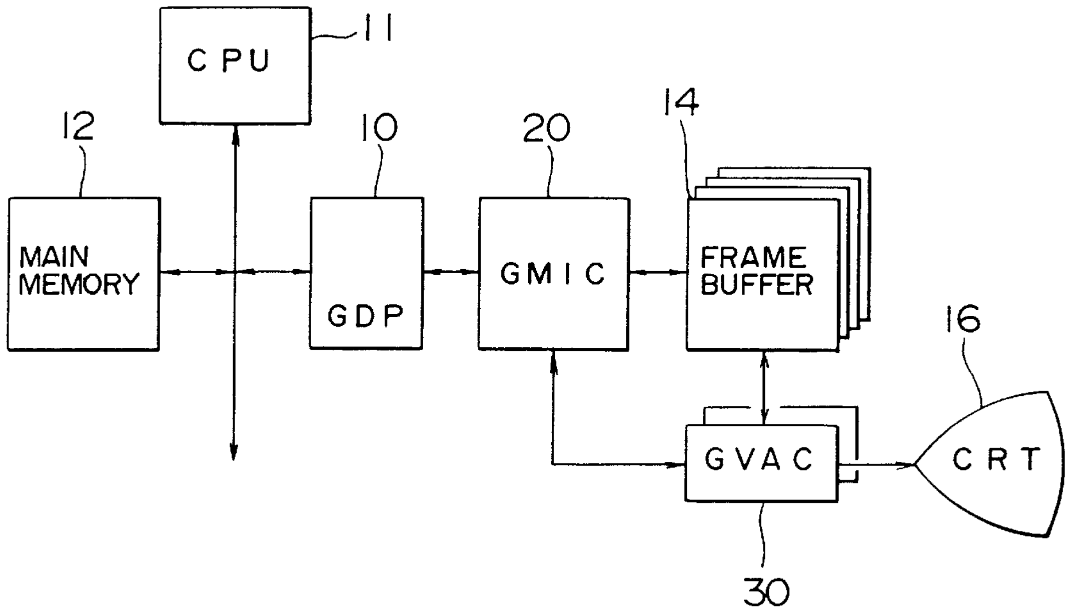
FIG. 29 is a schematic block diagram showing another embodiment of the invention.

Another embodiment of graphic processing system directed to further cost reduction will now be described with reference to FIG. 29.

According to this embodiment, a graphic processing system comprises a central processing unit (CPU) 11, a main memory 12, a graphic drawing processor (GDP) 10, a frame buffer 14, a memory interface controller (GMIC) 20, a video attribute controller 30, and a display unit 16 such as a CRT.

In drawing processing, the CPU 11 transfers to the GDP 10 a graphic processing command and parameter information and starts the GDP 10. Responsive to the CPU 11, the GDP 10 processes to prepare a graphic data on the frame buffer in accordance with a predetermined processing procedure. During this processing, the GMIC 20 responds to a frame buffer access of the GDP 10 to generate a memory control signal. When displaying the graphic stored in the frame buffer 14 on the CRT 16, the display data is read out of the frame buffer and converted by the GVAC 30 into a video signal which in turn is sent to the CRT 16.

The GMIC 20 and the GVAC 30 mainly provide memory controlling and video signal controlling, respectively, and they are provided in the form of LSI'S. Practically, the GDP 10 provided as the LSI, though its detailed circuit has not been illustrated in FIG. 1, is associated with a great number of peripheral logical gates used for memory controlling and video signal controlling. In contrast therewith, the GMIC 20 can be connected directly to the GDP 10 and frame buffer 14, and the GVAC 30 can be connected directly to the GDP 10 to the frame buffer 14 and CRT 16. Functions of the two will be detailed below.

Figure 30:
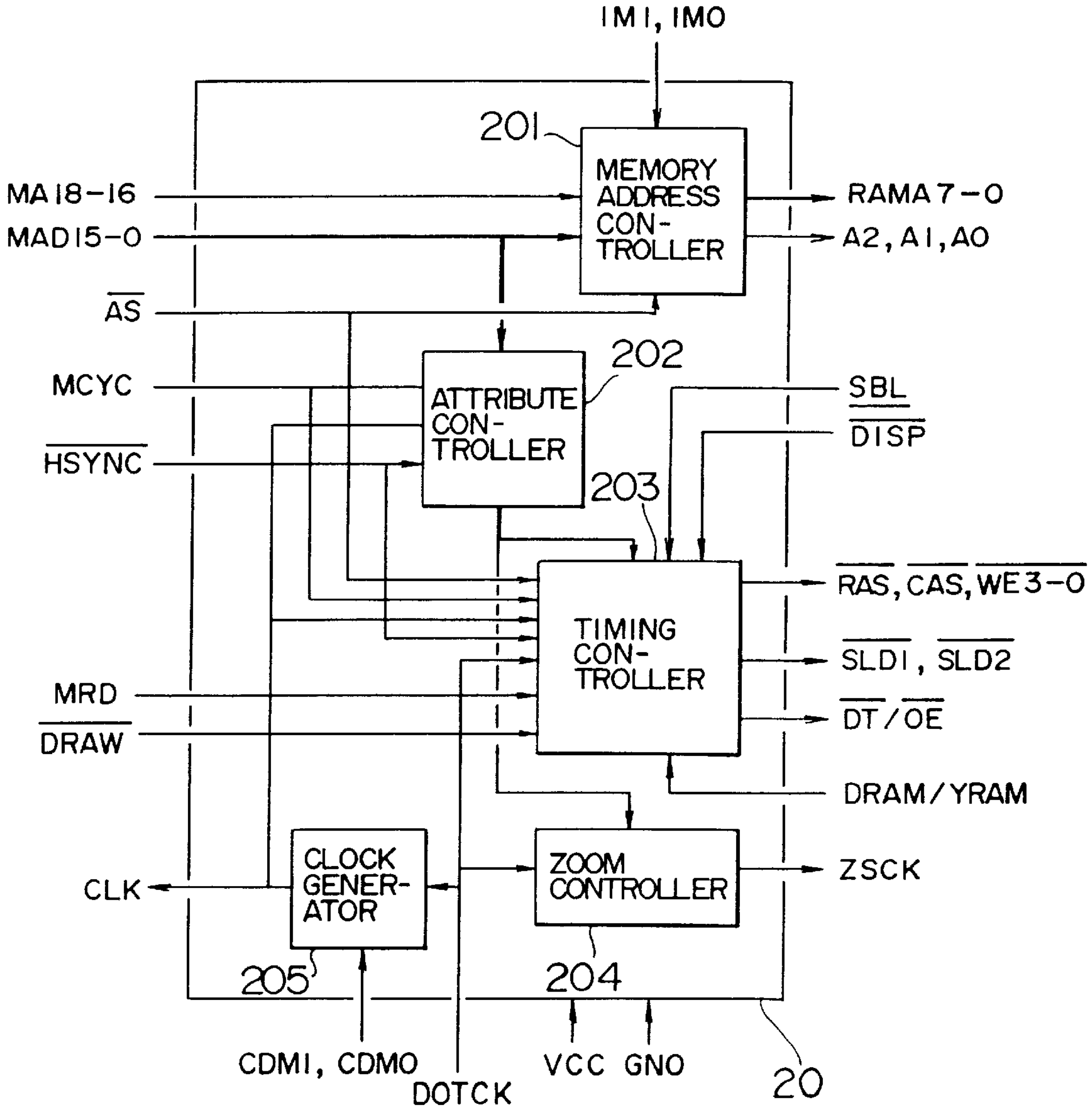
FIG. 30 is a block diagram showing the internal construction of a graphic memory interface controller (GMIC)

Referring to FIG. 30, the GMIC 20 comprises a memory address controller 201, an attribute controller 202, a timing controller 203, a clock generator 205, and a zoom controller 204. The memory address controller 201 delivers an address of frame buffer 14 outputted from the GDP 10 as a composite signal of a row address and a column address of a dynamic RAM. The attribute controller 202 temporarily stores attribute information outputted from the GDP 10 and sends control information to the timing controller 203. The timing controller 203 generates various signals for controlling the dynamic RAM and prepares a signal for controlling generation of a video signal corresponding to horizontal smooth scrolling. Based on a preset frequency division rate, the clock generator 205 generates a clock signal outputted to the GDP 10. The zoom controller 204 generates a video generation control signal for horizontal zoom display on the basis of information from the attribute controller.

Figure 31:
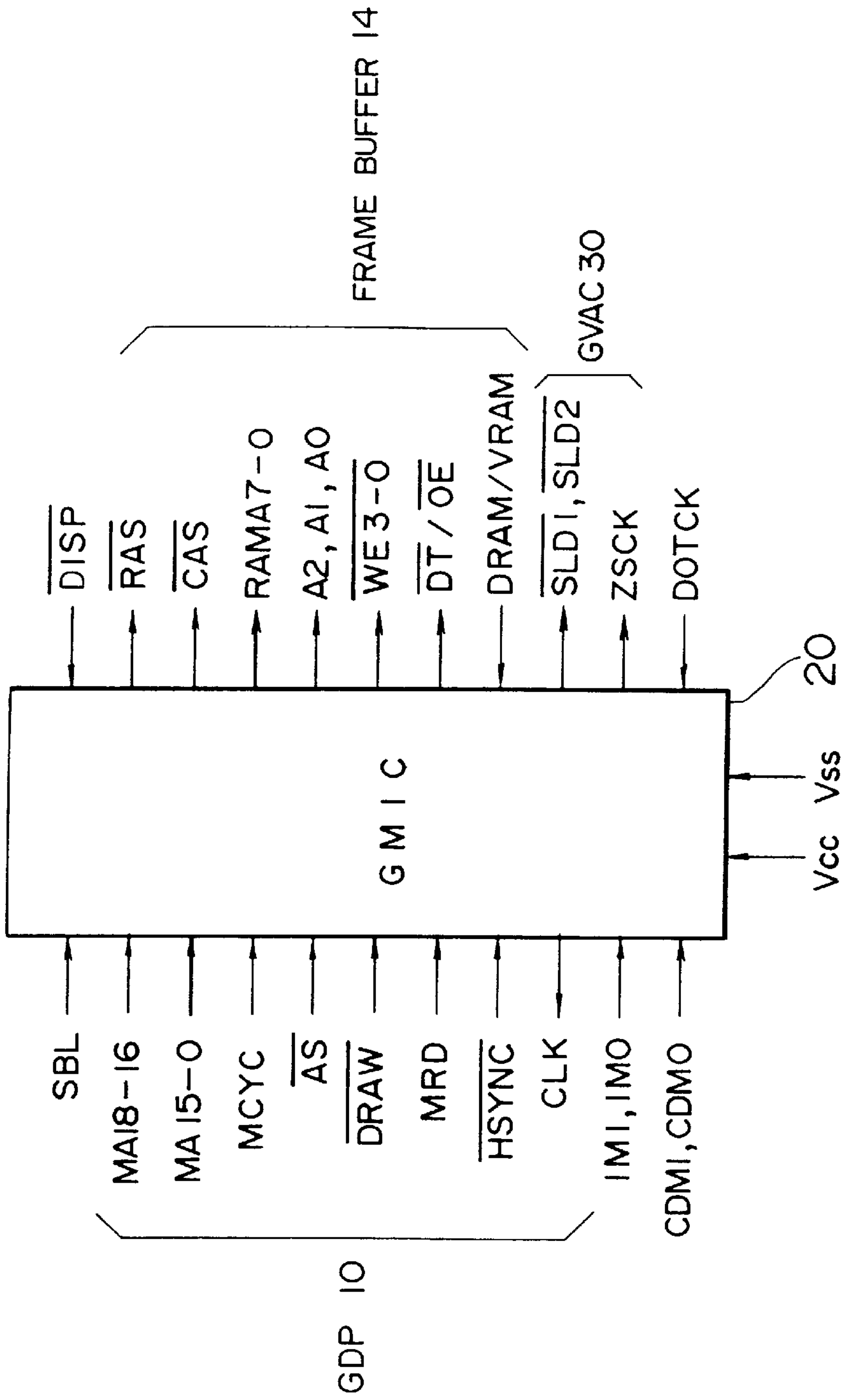
FIG. 31 is a diagram illustrative of a terminal layout of the CMIC.

FIG. 31 shows input and output signals of the GMIC 20 shown in FIG. 30. Functions of terminals, bus and individual signals are as follows.

(1) Power Supply Terminals Vcc and Vss

Used for supplying power to the GMIC 20. The terminal Vss is applied with ground potential and the terminal Vcc with +5 V.

(2) Memory Address Bus MA (MA 18 to MA 0: Input)

Used to input a signal delivered from the GDP 10 by which the GDP 10 accesses the frame buffer 14.

(3) Memory Cycle MCYC (Input)

An input signal indicative of a timing for the GDP 10 to access the frame buffer 14. When being at the "Low" level, this input signal indicates an addressing cycle.

(4) Address Stroke $\overline{AS}$ (Input)

An input signal for latch timing for the frame buffer address.

(5) Draw $\overline{DRAW}$ (Input)

An input signal indicative of either drawing cycle or display cycle of the GDP 10. The "Low" level of the $\overline{DRAW}$ signal indicates a drawing cycle and the "High" level indicates a display cycle.

(6) Memory Read MRD (Input)

The MRD input signal is for controlling the direction of data transfer between the GDP 10 and frame buffer 14 during the drawing cycle and used to generate signals "$\overline{WE}$ 0 to $\overline{WE}$ 3" which control write of data to the frame buffer 14. When the MRD signal is high, the GDP 10 reads the frame buffer 14 and when low, the GDP 10 writes the frame buffer 14.

(7) Horizontal Sync $\overline{HSYNC}$ (Input)

Outputted from the GDP 10 and indicative of a timing for the frame buffer 14 to deliver a refresh address. Also indicative of a timing for latching attribute control information delivered out of the GDP 10.

(8) Clock CLK (Output)

An output signal to which the internal operation of the GDP 10 is referenced. Generated by dividing a clock of a frequency which is n times the memory access timing frequency (memory cycle) of the frame buffer 14 at a frequency dividing rate determined by an externally inputted DOTCK signal which is set in accordance with CDM0 and CDM1 signals to be described later.

(9) Increment Mode IM (IM 1 and IM 0: Input)

The IM signal sets increment modes of the display address. The IM signal is set in accordance with a graphic address increment mode of the GDP 10. The IM signal is also used as a control signal for multiplexing row and column addresses of the dynamic RAM.

| IM 1, | IM 0 | Increment | Multiplexed address |
|---|---|---|---|
| 0 | 0 | +1 | A7-0 and A15-8 |
| 0 | 1 | +2 | A8-1 and A16-9 |
| 1 | 0 | +4 | A9-2 and A17-10 |
| 1 | 1 | +8 | A10-1 and A18-11 |

where,

Integral=(bit number per pixel)×(shift bit length)/16

(10) Clock Dividing Mode CDM (CDM 1 and CDM 0: Input)

The CDM input signal is for dividing the externally inputted DOTCK signal to prepare the CLK signal outputted to the GDP 10 and sets the frequency dividing ratio of the CLK signal.

| CDM 1, | CDM 0 | Frequency dividing ratio |
|---|---|---|
| 0 | 0 | 2 |
| 0 | 1 | 4 |
| 1 | 0 | 8 |
| 1 | 1 | 16 |

Frequency dividing ratio=[shift bit length]/$n$ where n=2 (single access mode)

n=4 (dual access mode)

(11) Dot Clock DOTCK (Input)

A clock input signal to which the internal operation of the GMIC 20 is referenced. The DOTCK signal is a high rate clock signal having one cycle which corresponds to one pixel display period.

(12) Shift Clock ZSCK (Output)

A clock signal for controlling the parallel-serial converter used for generation of video signals. The ZSCK signal is generated by controlling the frequency of the externally inputted DOTCK signal in accordance with a horizontal zoom rate which is attribute information outputted from the GDP 10.

(13) Shifter Load Timing $\overline{SLD\ 1}$ and $\overline{SLD\ 2}$ (Output)

Output signals indicative of timings for setting a graphic data into the parallel-serial converter adapted to convert a display data into a video signal. The $\overline{SLD\ 1}$ signal is a load timing signal of normal display timing and the $\overline{SDL\ 2}$ signal is a load timing signal which provides output timings varying with the amounts of horizontal smooth scrolling which is attribute information outputted from the GDP 10.

(14) RAM Mode DRAM/VRAM (Input)

Sets modes of the RAM used for the frame buffer 14. More particularly, when the DRAM/VPAM signal is high, the frame buffer 14 is indicated to be a dynamic RAM and when low, the frame buffer 14 is indicated to be a shifter built-in type dual port memory (VRAM).

(15) Data Transfer/Output Enable $\overline{DT}/\overline{OE}$ (Output)

The $\overline{DT}/\overline{OE}$ signal is an out-enable signal for the RAM when the GDP 10 accesses the frame buffer 14 and controls read of data from the RAM. In the VRAM mode, the $\overline{DT}/\overline{OE}$ signal causes a signal for controlling data transfer to a shifter within the VRAM to be delivered out.

(16) Write Enable $\overline{WE}$ ($\overline{WE\ 3}$ to $\overline{WE\ 0}$: Output)

The $\overline{WE}$ signal is for controlling write of a drawing data from the GDP 10 to the frame buffer 14. With the $\overline{WE}$ signal being at the "Low" level, write of the drawing data is indicated.

(17) Address A (Bits A2 to A0: Output)

The A signal is for indicating a specified one word when data transfer is executed between the GDP 10 and the frame buffer 14. By using the A signal, data transfer of a desired address can be ensured.

(18) RAM Address RAM (RAMA 7 to RAMA 0: Output)

A signal for sorting out frame buffer addresses for drawing or display (memory addresses MA 18 to MA 0) into row addresses and column addresses in accordance with an increment mode and delivering the row and column addresses.

(19) Column Address Strobe CAS (Output)

An output signal indicative of a timing for latching a row address outputted to the frame buffer.

(20) Row Address Strobe RAS (Output)

An output signal indicative of a timing for latching a column address outputted to the screen.

(21) Display $\overline{DISP}$ (Input)

An input signal indicative of a display period of the screen. In the VRAM mode, the $\overline{DISP}$ signal is used for generating a $\overline{DT/OE}$ signal for data transfer control.

(22) Shift Bit Length SBL (Input)

The SBL signal is used to cause the GMIC to prepare the load timing signals $\overline{SLD}$ ($\overline{SLD\ 1}$ and $\overline{SLD\ 2}$) for generation of the video signal.

In the GMIC 20, two kinds of attribute information are handled which are inputted from the GDP 10.

(1) Horizontal Zoom Coefficient HZ (Bits HZ 3 to HZ 0)

These four bits set a zoom display coefficient for horizontal zoom display.

(2) Horizontal Smooth Scrolling Dot Number HSD (Bits HSD 3 to HSD 0)

These four bits set the number of horizontal smooth scrolling dots and the load timing signal ($\overline{SLD}$) is controlled by the dot number information.

Figure 32:
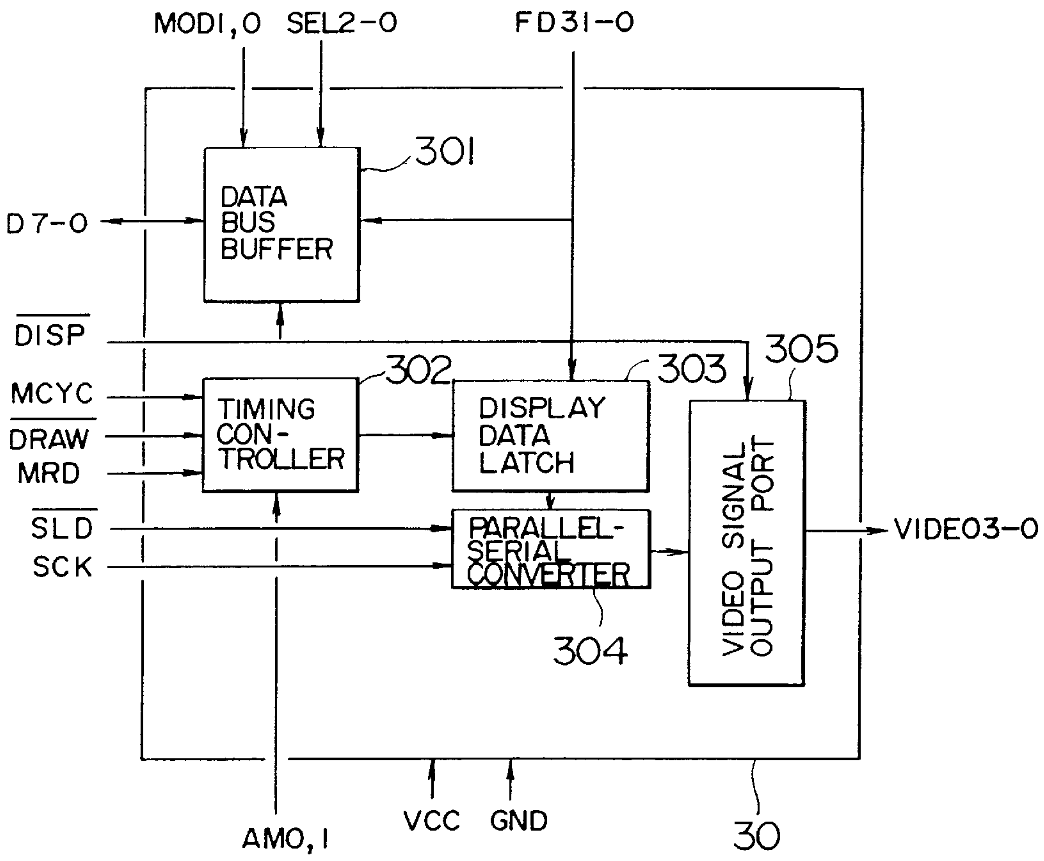
FIG. 32 is a block diagram showing the internal construction of a graphic video attribute controller (GVAC)

Referring to FIG. 32, the GVAC 30 comprises a data bus buffer 301, a timing controller 302, a display data latch 303, a parallel-serial converter 304, and a video signal output port 305.

The data bus buffer 301 is externally instructed to control data transfer between the GDP 10 and the frame buffer 14. Various timing signals are supplied to the GVAC 30 through the timing controller 302. The display data latch 303 temporarily stores display data read out of the frame buffer 14 and then supplies the display data to the parallel-serial converter 304. The parallel-serial converter 304 responds to an externally inputted timing signal to convert the parallel display data into a serial data. The video signal output port 305 delivers to the CRT 16 the serial data as a video signal.

Figure 33:
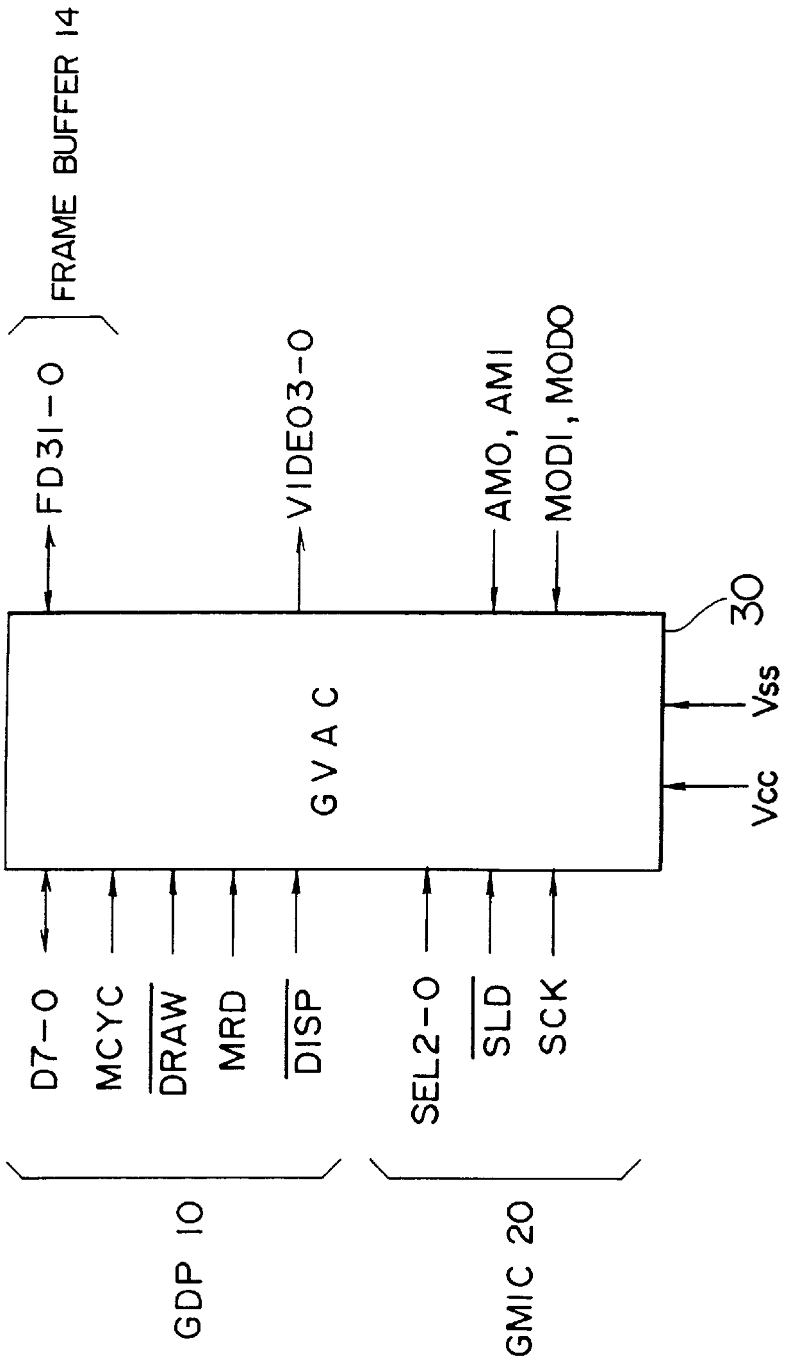
FIG. 33 is a diagram illustrative of a terminal layout of the GVAC.

FIG. 33 shows input and output signals of the GVAC 30. Functions of terminals, bus and individual signals are as follows.

(1) Power Supply Terminals Vcc and Vss

Used for supplying power to the GVAC 30. The terminal Vss is grounded and the terminal Vcc is supplied with +5 V.

(2) Memory Cycle MCYC (Input)

An input signal indicative of a timing for the GDP 10 to access the frame buffer 14. When being at the "High" level, this input signal indicates a data cycle.

(3) Memory Read MRD (Input)

The MRD input signal is for controlling the direction of data transfer between the GDP 10 and frame buffer 14 during the drawing cycle and used as a data transfer control signal within the data bus buffer.

(4) Draw $\overline{DRAW}$ (Input)

An input signal indicative of either drawing cycle or display cycle of the GDP 10. The "Low" level of the $\overline{DRAW}$ signal indicates a drawing cycle and the "High" level indicates a display cycle.

(5) Display $\overline{DISP}$ (Input)

An input signal indicative of a display period of the screen. The $\overline{DISP}$ signal is used for controlling delivery of the video signal.

(6) Data Bus D (Bits D7 to D0: Input/Output)

A data signal for the GDP 10used for data transfer between the GDP 10 and frame buffer 14. The direction of the data transfer by this signal is controlled by the MRD signal.

(7) Frame Memory Data FD (Bits FD 31 to FD 0: Input/Output)

A data signal for the frame buffer 14 and used for data transfer of the GDP 10 and for inputting a display data. The direction of the data transfer by this signal is controlled by the MRD signal.

(8) Select SEL (Bits SEL 2 to SEL 0: Input)

A data selection signal used during transfer of 32 bits of data signal for the frame buffer 14 and an 8-bit data for the GDP 10, and inputted from the GDP 10. Normally, lower bits (A2 to A0) of the address signal are used as the SEL signal.

(9) Load Timing $\overline{SLD}$ (Input)

An $\overline{SLD}$ input signal is indicative of a timing for setting a data into the parallel-serial converter 304 and inputted externally.

(10) Shift Clock SCK (Input)

An externally inputted signal for controlling the parallel-serial converter 304 and acting as a timing signal for instructing parallel-serial conversion.

(11) Video VIDEO (Bits VIDEO 3 to VIDEO 0: Output)

A signal for delivering to the CRT 16 a display video signal converted from the parallel-serial converter 304.

(12) Access Mode AM (Bits AM 1 and AM 0: Input)

A signal for setting an access mode of frame buffer 14 of the GDP 10 and used to prepare a latch timing for the display data.

| AM 0, | AM 1 | Access mode |
|---|---|---|
| 0 | 0 | Single access mode |
| 0 | 1 | not used |
| 1 | 0 | Background screen of dual access mode |
| 1 | 1 | Overlap screen |

(13) Mode MOD (Bits MOD 1 and MOD 0: Input)

Used for inputting a mode prescribing the manner of the 32-bit serial-parallel converter 304 within the GVAC 30. By setting the MOD signal, the connection relation between the video signal and the data of the parallel-serial converter 304 and frame buffer 14 can be

| MOD 1, | MOD 0 | Mode |
|---|---|---|
| 0 | 0 | 16-bit shifter × 2, 4 bits/pixel |
| 0 | 1 | 32-bit shifter × 1, 4 bits/pixel |
| 1 | 0 | 8-bit shifter × 4, 8 bits/pixel |
| 1 | 1 | 16-bit shifter × 2, 8 bits/pixel |

Figure 34A:
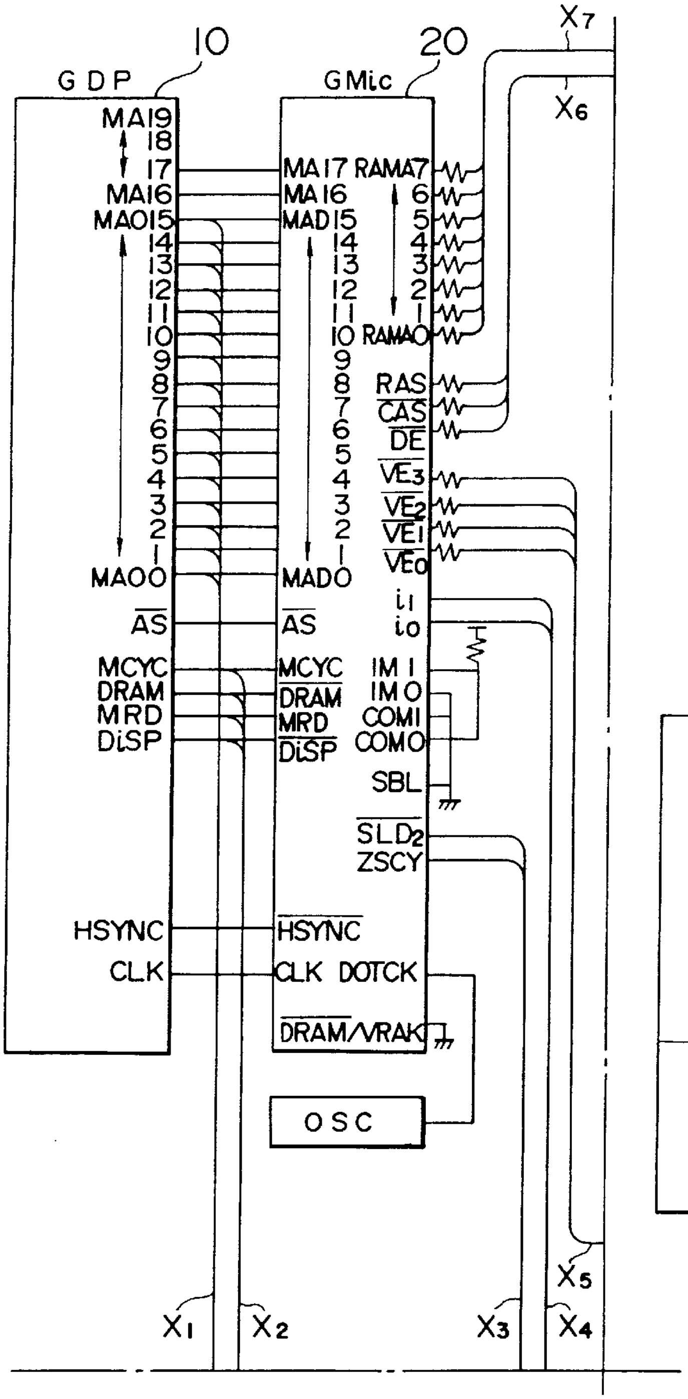
FIGS. 34(A), 34(B) and 34(C) are to be arrayed, wherein FIGS. 34(A), 34(B) and 34(C) combined together as shown in FIG. 34 show in detail a circuit diagram of the graphic display system according to an embodiment of the invention.
Figure 34:
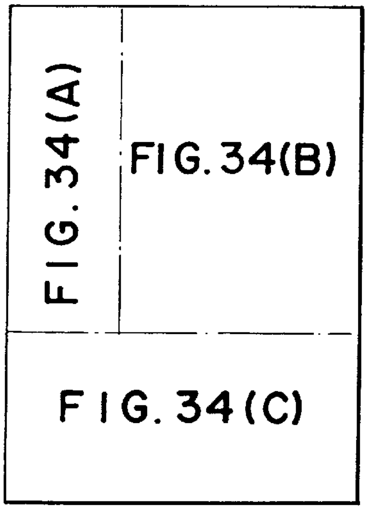
Figure 34B:
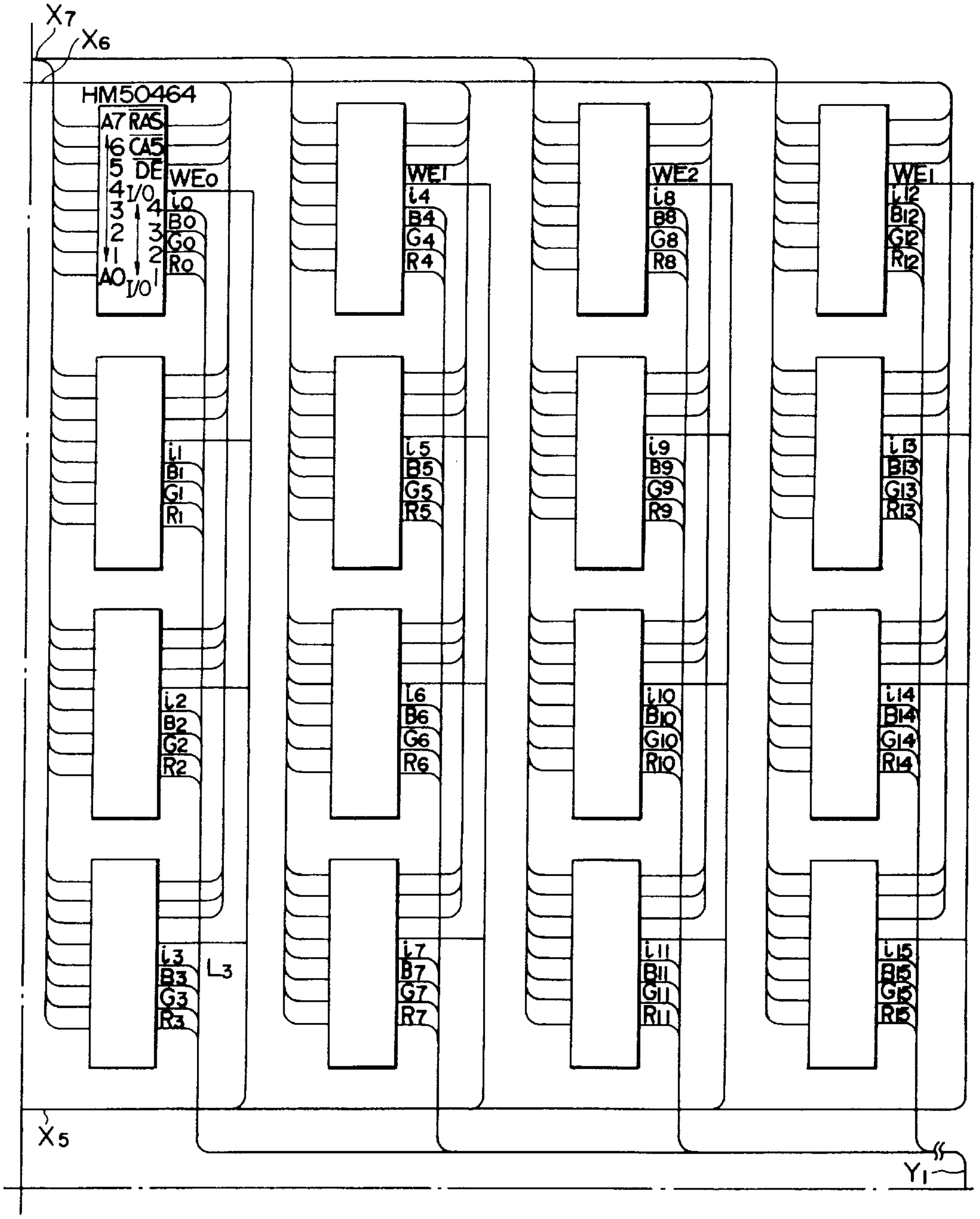
Figure 34C:
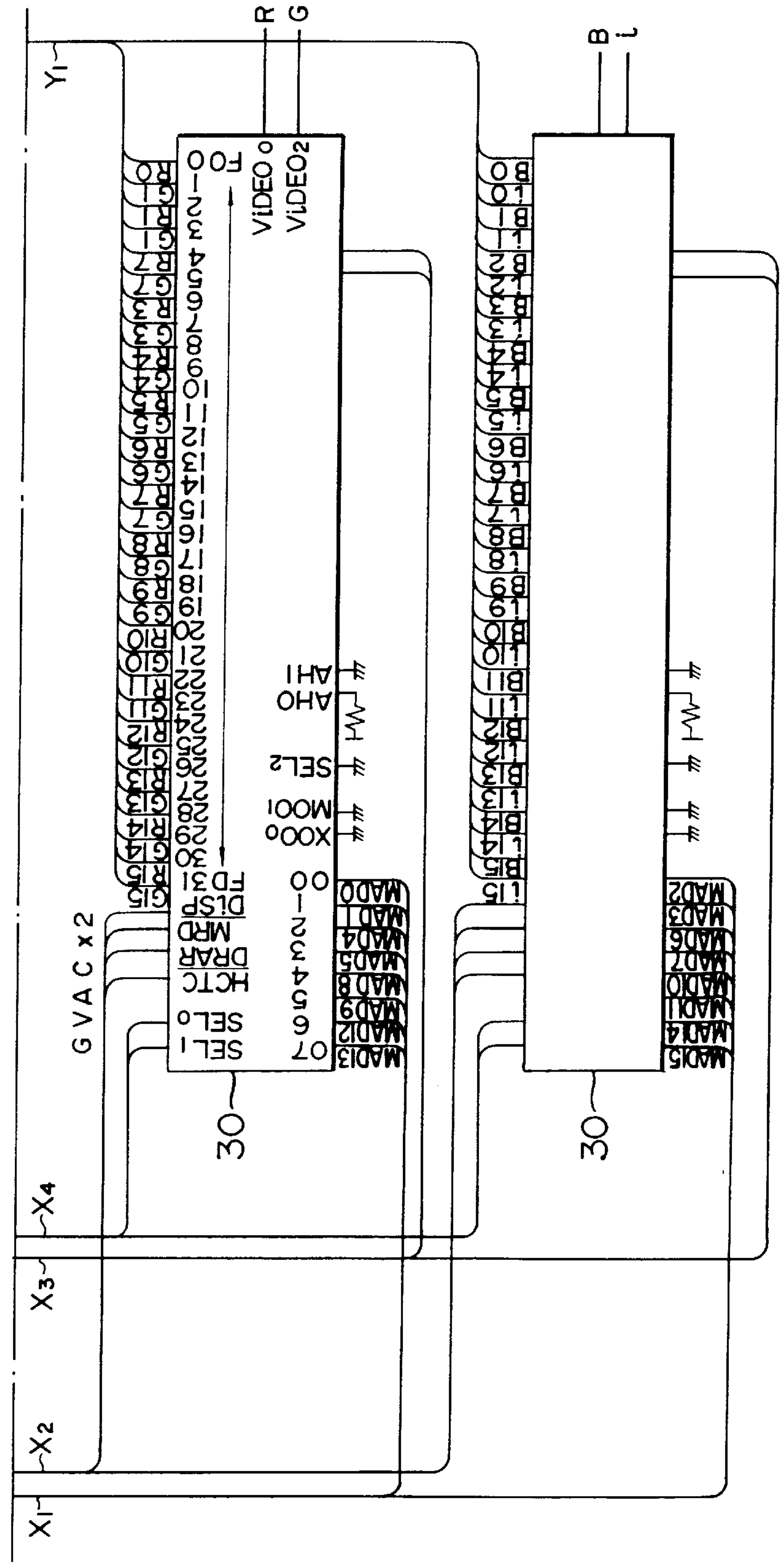

FIG. 34 shows an example of connection circuit of the graphic processing system utilizing the GMIC 20 and GVAC 30.

Advantageously, by providing the GVAC 30 and GMIC 20 with programmable faculties, a variety of graphic processing systems can be constructed easily with a small number of parts.

As has been described in detail, the present invention can advantageously realize a graphic processing system with high speed character processing performance.

What is claimed is:

1. A graphic processing system comprising:

a first memory which stores a program;

a CPU which executes said program read out from said first memory;

a second memory which stores bit map data; and a graphic processor by which said bit map data is read out from second memory based on commands from said CPU, said bit map data is deformed based on the commands from said CPU, and the deformed bit map data is stored in said second memory.

2. A graphic display system according to claim 1, wherein said graphic processor performs a magnification or a reduction of said bit map data read out from said second memory.

3. A graphic display system comprising:

a first memory which stores a program;

a CPU which executes said program read out from said first memory;

a second memory which stores bit map data;

a graphic processor by which said bit map data is read out from second memory based on commands from said CPU, said bit map data is deformed based on the commands from said CPU, and the deformed bit map data is stored in said second memory; and a display device which displays said bit map data stored in said second memory.

4. A graphic display system according to claim 3, wherein said graphic processor performs a magnification or a reduction of said read bit map data read out from said second memory.

* * * * *